United States Patent
Hayashi

[11] Patent Number: 5,967,459
[45] Date of Patent: Oct. 19, 1999

[54] BALLOON WITH CONTROLLED PARACHUTE

[76] Inventor: Masahiko Hayashi, 12-22, Tsurumaki 3-chome, Setagaya-ku, Tokyo, Japan

[21] Appl. No.: 08/858,322

[22] Filed: May 19, 1997

[51] Int. Cl.$^6$ .................................................. B64B 1/02
[52] U.S. Cl. ................................................ 244/32; 244/152
[58] Field of Search ................................. 244/31, 32, 33, 244/146, 145, 152

[56] References Cited

U.S. PATENT DOCUMENTS

| | | | |
|---|---|---|---|
| 1,274,207 | 7/1918 | Sordyka | 244/32 |
| 1,364,596 | 1/1921 | Wales | 244/146 |
| 1,553,340 | 9/1925 | Upson | 244/31 |
| 1,569,391 | 1/1926 | Pearl et al. | 244/32 |
| 1,678,537 | 7/1928 | Schonbrun | 244/146 |
| 3,113,748 | 12/1963 | Struble, Jr. | 244/31 |
| 3,116,037 | 12/1963 | Yost | 244/31 |

FOREIGN PATENT DOCUMENTS

| | | | |
|---|---|---|---|
| 471762 | 11/1974 | France | 244/32 |
| 5-338592 | 12/1993 | Japan | 244/32 |

*Primary Examiner*—Galen L. Barefoot
*Attorney, Agent, or Firm*—Jordan and Hamburg LLP

[57] ABSTRACT

The present invention relates to a floatable aircraft such as a parachute balloon. The parachute balloon is comprised an envelope which is able to be collapsed and stored during periods of nonuse. A parachute is attached to the envelope, enabling the parachute balloon to fall safely by the effect of the parachute in various circumstances including the usual descent or an emergency during a fall, such as when out of fuel.

13 Claims, 25 Drawing Sheets

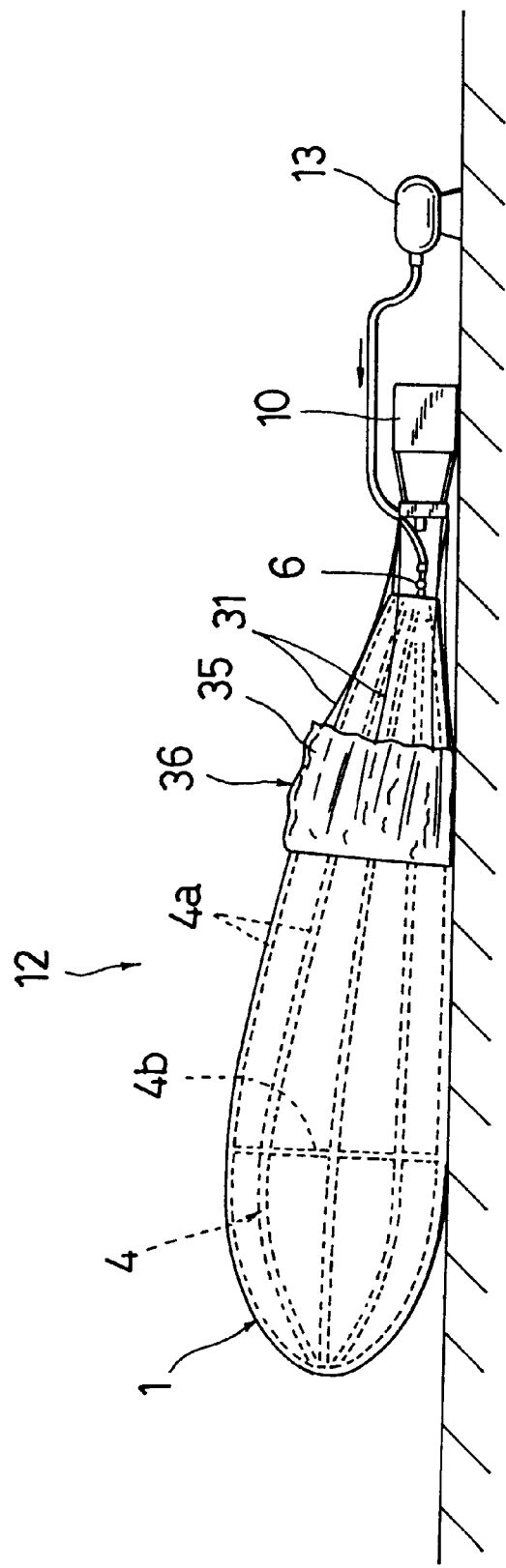

BALLOON WITH CONTROLLED PARACHUTE

BACKGROUND OF THE INVENTION

The present invention relates to a floatable aircraft such as a parachute balloon having an envelope in the shape of a balloon or airship capable of folding and being easily stored during periods of nonuse.

The above referred balloon or airship envelope can be collapsed and and stored while not in use, and combines a durable outer surface with an inner skin having high air tightness or thermal resistance.

The heretofore known envelope of balloon or airship shape is, however, difficult to inflate and expand to the envelope.

Moreover, because the envelope is formed of flexible material, its hardness is low, and it is difficult to improve the resistance against wind or flight performance. Additionally, it is difficult to control the direction and speed during descent.

SUMMARY OF THE INVENTION

It is an object of the present invention to provide a parachute balloon capable of collapsing and being easily stored during periods of nonuse after same is used previously.

It is another object to the present invention of provide a parachute balloon with more rigidity, and capable of easy operation merely requiring the supply of gas, such as air, helium or hydrogen into a flexible gas storage tube which is the frame, capable of maintaining the inflated condition of an envelope when the envelope is inflated.

It is still another object of the present invention to provide a parachute balloon which can fall safely and be controlled the direction and its speed during descent.

The prescribed and other objects and features of the present invention will be understood by the following description read in conjunction with the accompanying drawings.

The drawings are illustrative and are not to be limitative of the scope of the present invention.

BRIEF DESCRIPTION OF THE DRAWINGS

FIG. 5 is an explanatory side view showing the manner of supplying in air in a first embodiment of the present invention;

DETAILED DESCRIPTION OF THE INVENTION

Figure 1:
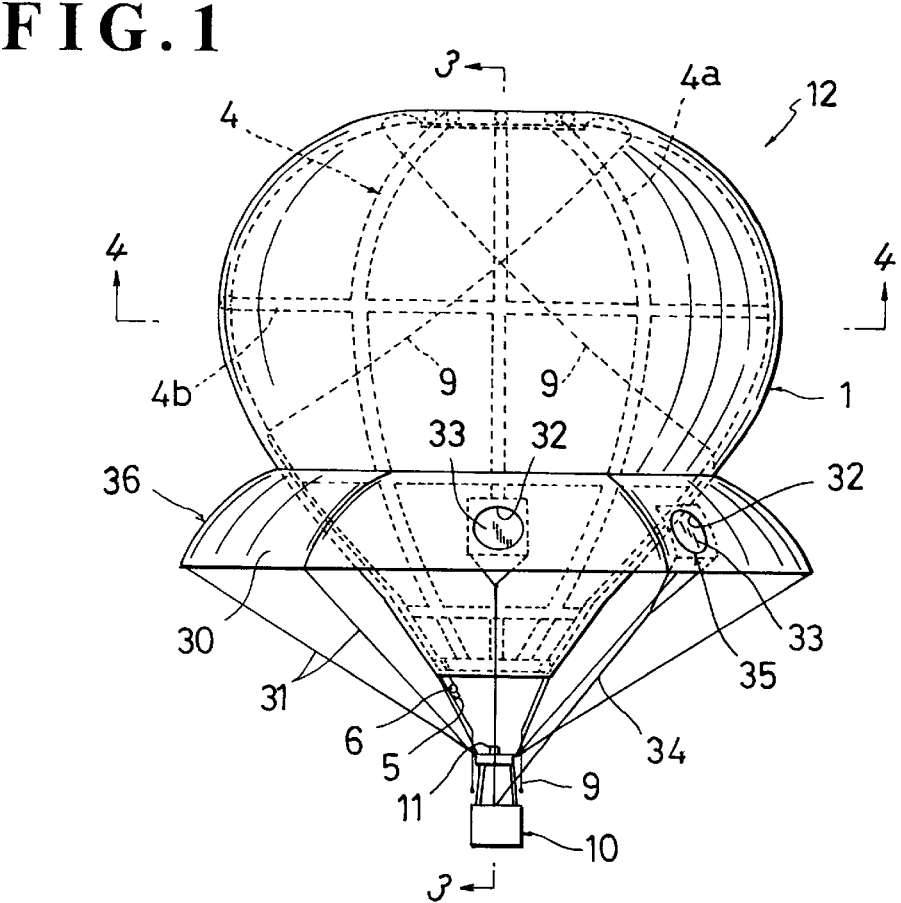
FIG. 1 is a front view showing a first embodiment of the present invention.
Figure 2:
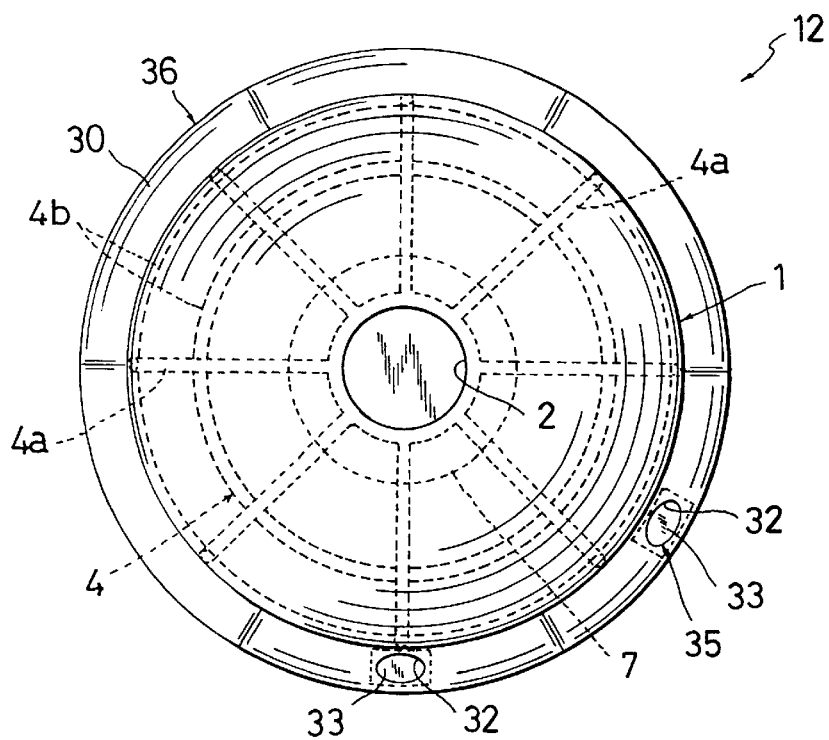
FIG. 2 is a top view showing a first embodiment of the present invention.
Figure 3:
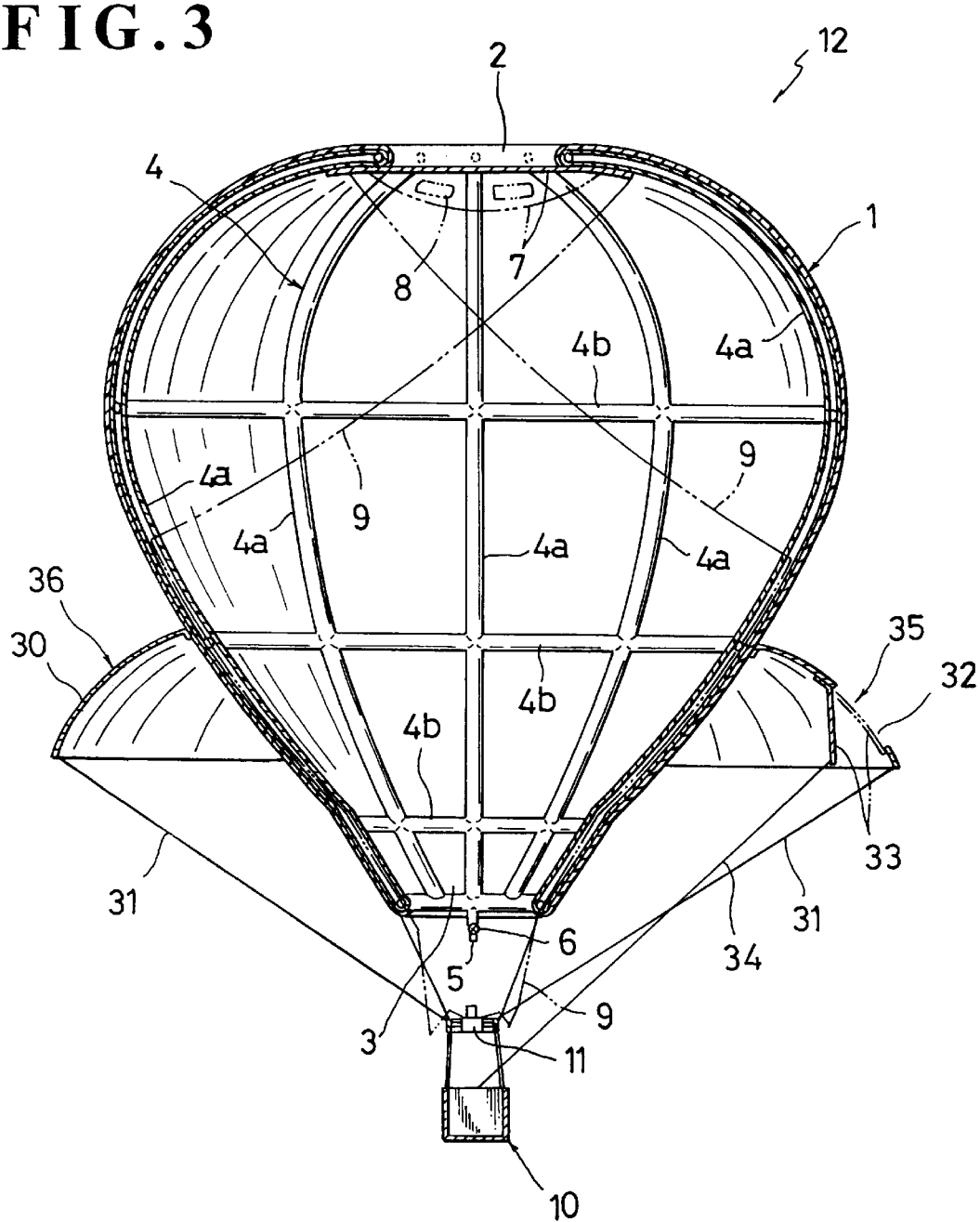
FIG. 3 is an expanded cross-sectional view taken on line 3—3 of FIG. 1.
Figure 4:
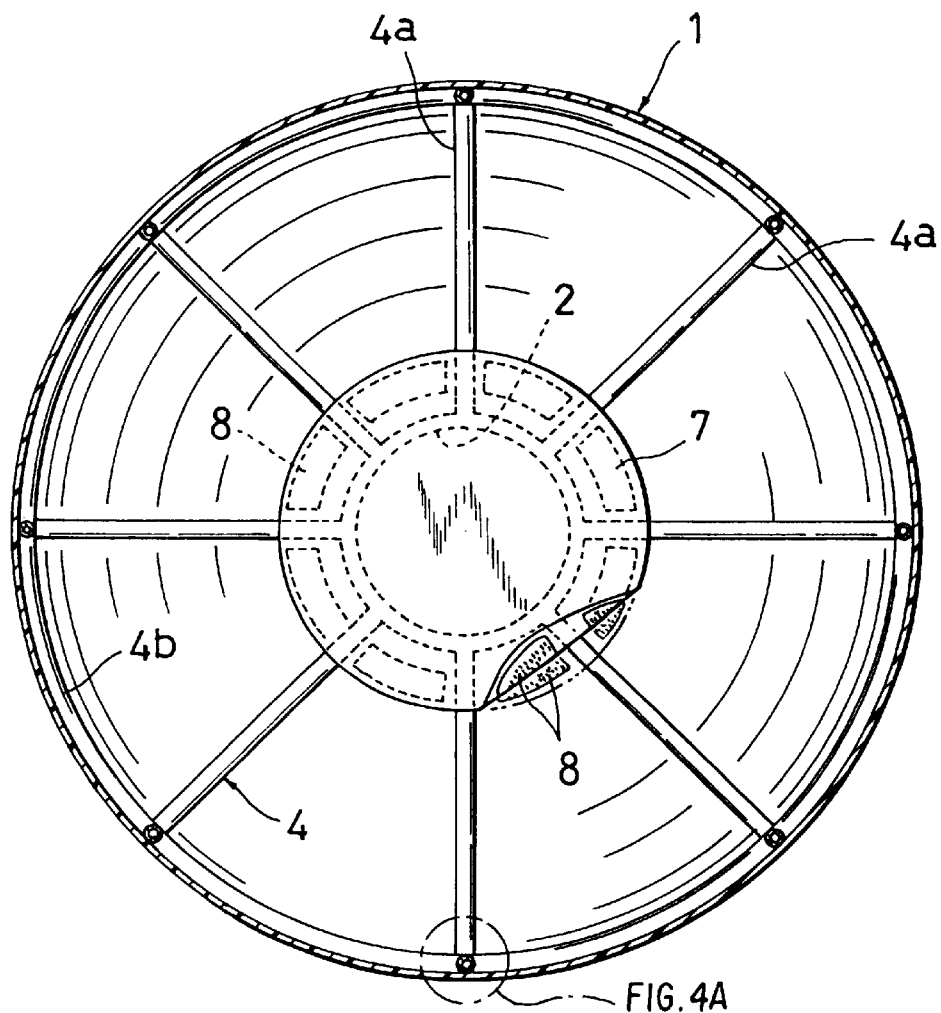
FIG. 4 is an expanded cross-sectional view taken on line 4—4 of FIG. 1.
Figure 4A:
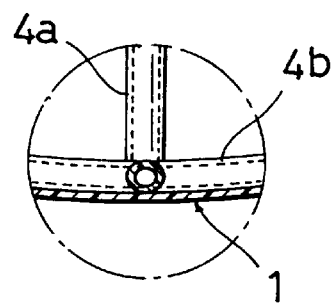
FIG. 4A is an expanded view of a detail of FIG. 4.

Preferred embodiments of the present invention will be described in more detail with reference to the accompanying drawings.

FIGS. 1 to 9 illustrate an embodiment of the present invention in which an envelope 1 is formed in the shape of a hot-air balloon. A release valve 2 for a heat release is formed at the upper part of the envelope 1, and a mouth 3 to introduce heat therein is formed at the lower part of the envelope 1. Therefore, the envelope 1 is constructed of a material such as nylon or tetoron clothes, advantageously having a resinous coating to improve airtightness and to protect against debasement.

A flexible gas storage tube 4 which is attached to the envelope 1 functions as a frame thereof when inflated. The flexible gas storage tube 4 may maintain the inflated condition of the envelope 1. Also the flexible gas storage tube 4 comprises a plurality of vertical gas storage tubes 4a provided equally in a vertical manner all around the envelope 1, and a plurality of horizontal gas storage tubes 4b in the shape of a ring at the horizontal way at fixed spaces around the envelope 1. An open-shut valve 6 is attached to a gas injection hole 5 formed of the lower part of the horizontal gas storage tube 4b, serving as a supply-hold device for gas such as air, helium or hydrogen into the vertical and horizontal gas storage tubes 4a and 4b. Also the horizontal gas storage tubes 4b are connected directly with the vertical gas storage tubes 4a. In addition, the horizontal gas storage tubes 4b are provided with slight measuring intervals in the mouth 3 to permit the shape of the mouth 3 to be properly maintained.

A parachute vent 7 is attached to the envelope 1 by a face fastener in a manner allowed the release valve 2 to be opened and closed. Additionally, a valve line 9 is attached to the parachute vent 7 for the operation, projecting from the mouth 3 of the envelope 1.

A gondola 10 is provided at the lower part of the envelope 1 in a suspended condition. Also, a burner 11 for supplying heat within the envelope 1 is attached to the gondola 10.

The envelope 1 is provided with a parachute 36, having a control device for falling direction 35. The parachute 36 comprises a parachute body 30 in the shape of a skirt and a plurality of support ropes 31. The parachute body 30 is fixed by sewing on the inner part thereof to the outer part of the envelope 1 in a position lower than the center of the envelope 1. One of the ends of the support ropes 31 are attached to outer part of the parachute body 30 at fixed spaces, and opposite ends thereof are attached to the gondola 10. The support ropes 31 are provided to support the parachute 36 by the air resistance added to the parachute body 30.

The control device for falling direction 35 comprises two air vents 32, 32, open-close valves 33, 33 and operation ropes 34, 34. Two air vents 32, 32 are formed at one side part on the parachute body 30, the positions being from forty-five to ninety degree apart. The open-close valves 33, 33 are sewn on the parachute body 30 at one end part thereof each of air vents 32, 32 to be opened and closed. Additionally, the operation ropes 34, 34 are attached to the two open-close valves 33, 33, and the operator can operate each operation rope 34 from the gondola 10 to open and close the two open-close valves 33,33.

When above-mentioned parachute balloon 12 is used, the envelope 1 is expanded. To inflate the envelope 1, a gas is supplied into the horizontal gas storage tube 4b and vertical gas storage tube 4a using the air pump 13 from the gas injection hole 5, and the gas injection hole 5 is closed by the open-shut valve 6 after the envelope 1 is inflated.

Secondly, hot air is supplied into the envelope 1 using the burner 11 on the gondola 10, and the envelope 1 is made to rise. Additionally, the parachute balloon 12 can be floated and flown up in the same manner as operated previously.

Figure 6:
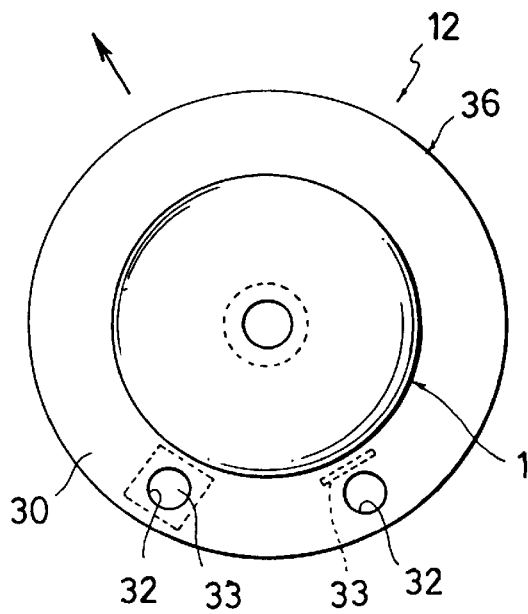
FIG. 6 is an explanatory top view on condition of a fall to the left showing a first embodiment of the present invention.
Figure 7:
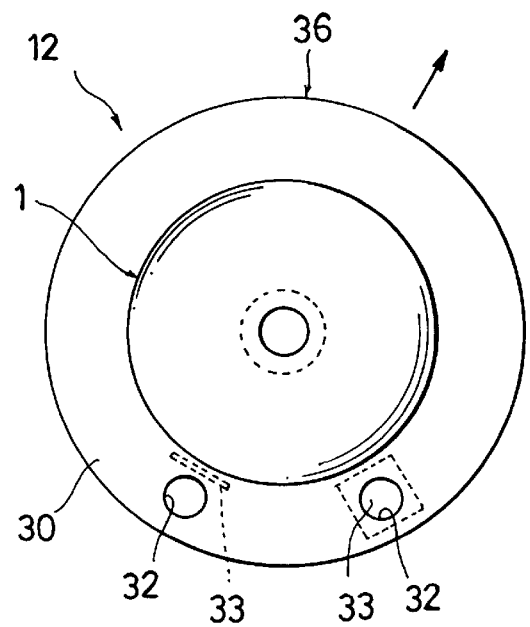
FIG. 7 is an explanatory top view on condition of a fall to the right showing a first embodiment of the present invention.
Figure 8:
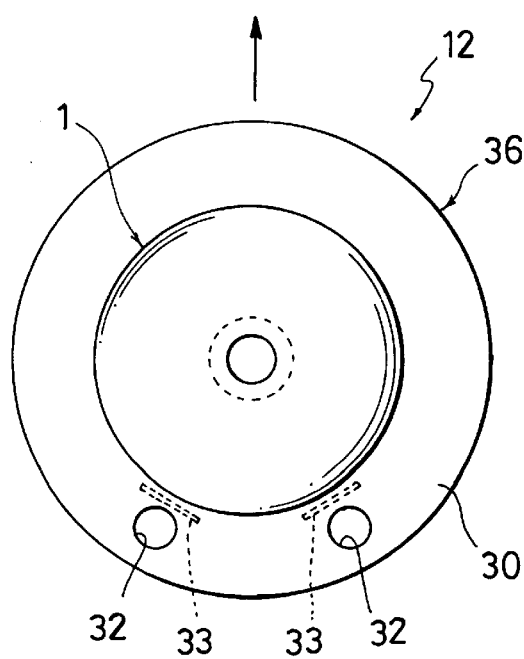
FIG. 8 is an explanatory top view on condition of a fall forward showing a first embodiment of the present invention.
Figure 9:
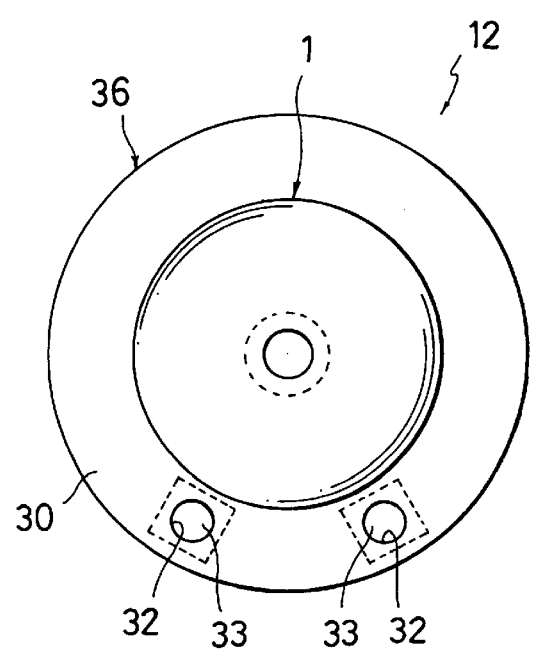
FIG. 9 is an explanatory top view on the condition of a fall downward showing a first embodiment of the present invention.

Although the parachute balloon 12 descends when the burning of the burner 11 is stopped, and the degree of hot air within the envelope 1 is therefore reduced, the parachute body 30, when it falls, spreads. After that, when the right open-close valve 33 of the control device for the falling direction 35 is opened by the operation rope 34, and only the right air vent 32 is opened, the parachute balloon 12 falls to the left side as shown in FIG. 6. When the left open-close valve 33 of the control device for the falling direction 35 is opened by the operation rope 34, and only the left air vent 32 is opened, the parachute balloon 12 falls to the right side as shown in FIG. 7. When both of the air vents 32, 32 are opened, the parachute balloon 12 falls in a forward direction as shown in FIG. 8. When both of the air vents 32, 32 are closed, the parachute balloon 12 can not be controlled as to the direction of a fall, but the falling speed is reduced as shown in FIG. 9.

At the time of nonuse, when the open-shut valve 6 is opened and the gas injection hole 5 is opened, the gas such as air, helium or hydrogen is released from the vertical and horizontal gas storage tube 4a and 4b. As a result, the envelope 1 has a characteristic of same prior to use and can be collapsed and put away.

Other embodiments of the present invention will now be described with reference to FIGS. 10 to 52. Through the drawings of the embodiments, like components are denoted by like numerals as of the first embodiment and will be explained in no more detail than necessary.

Figure 10:
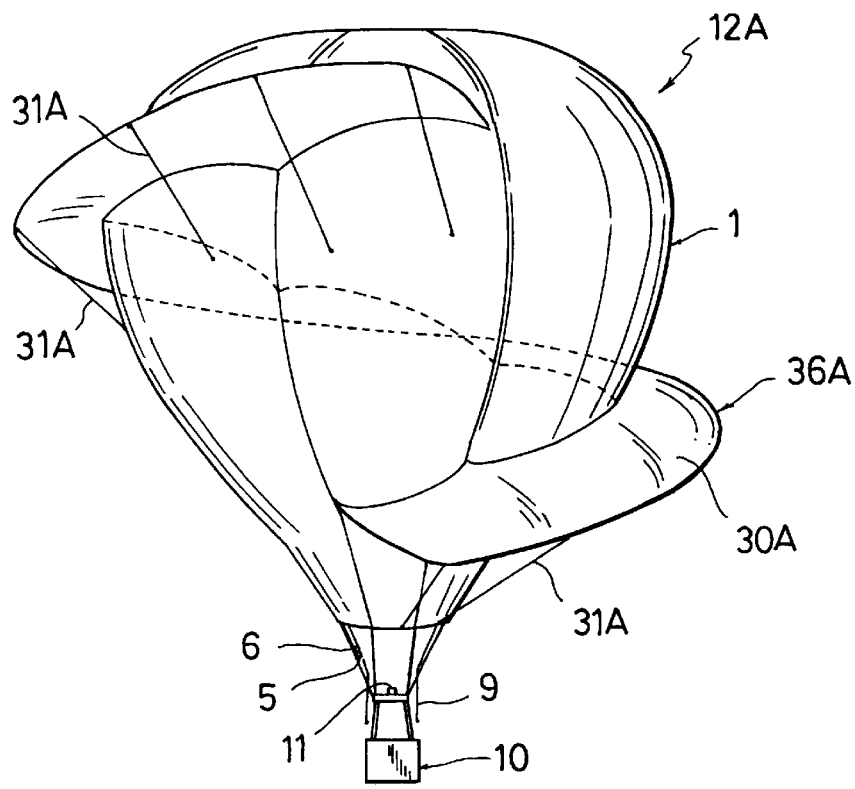
FIG. 10 is a front view showing a second embodiment of the present invention.
Figure 11:
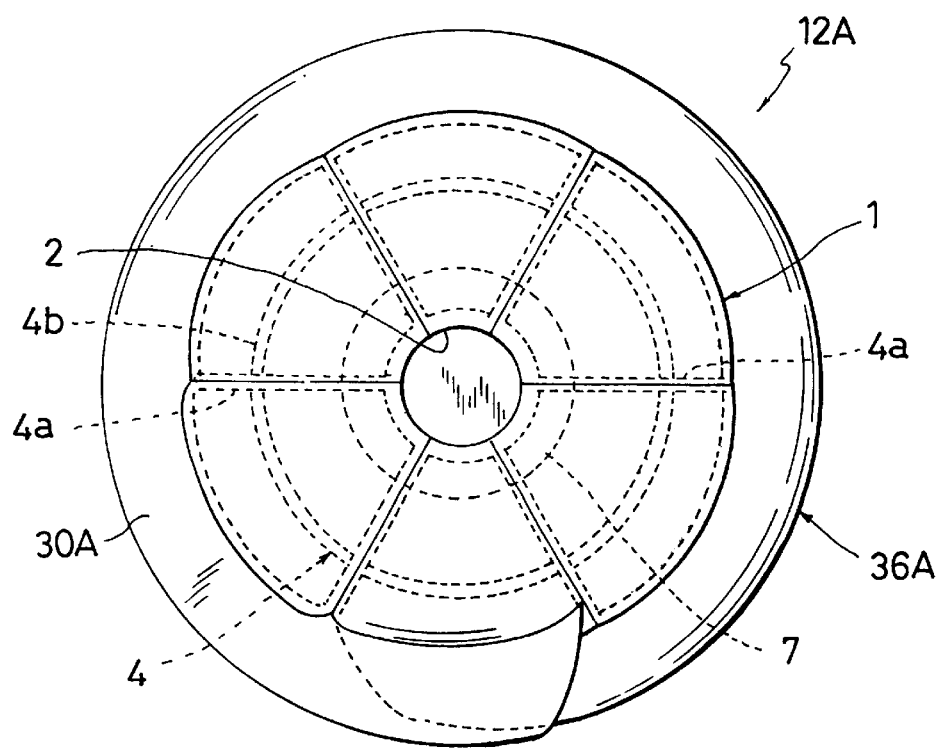
FIG. 11 is a top view showing a second embodiment of the present invention.

A second embodiment of the present invention shown in FIGS. 10 to 11 is distinguished from the first embodiment by the fact that the parachute 36 is replaced with another type in the form of a spiral parachute 36A. The spiral parachute 36A comprises a parachute body in the shape of spiral 30A and a plurality of support ropes 31A. The parachute body 30A is fixed by sewing on the outer part of the envelope 1 with an inside part thereof.

The plurality of support ropes 31A support air-resistance added to the parachute body 30A. One of each the support ropes 31A is attached to an outer part of the parachute body in the shape of spiral 30A at fixed intervals, and the other ends thereof are attached to the envelope 1. A parachute balloon 12A with the parachute in the shape of spiral 36A according to the second embodiment will provide the same effects as the first embodiment, and the parachute balloon 12A can descend with turning when it falls.

Figure 12:
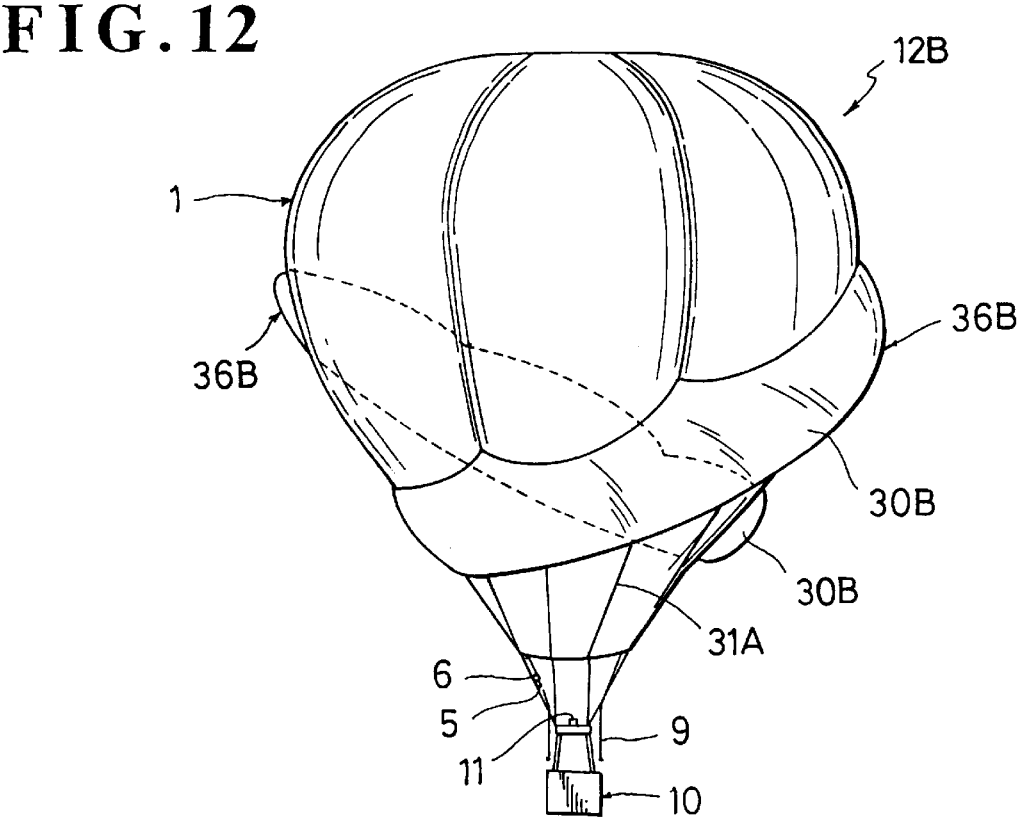
FIG. 12 is a front view showing a third embodiment of the present invention.
Figure 13:
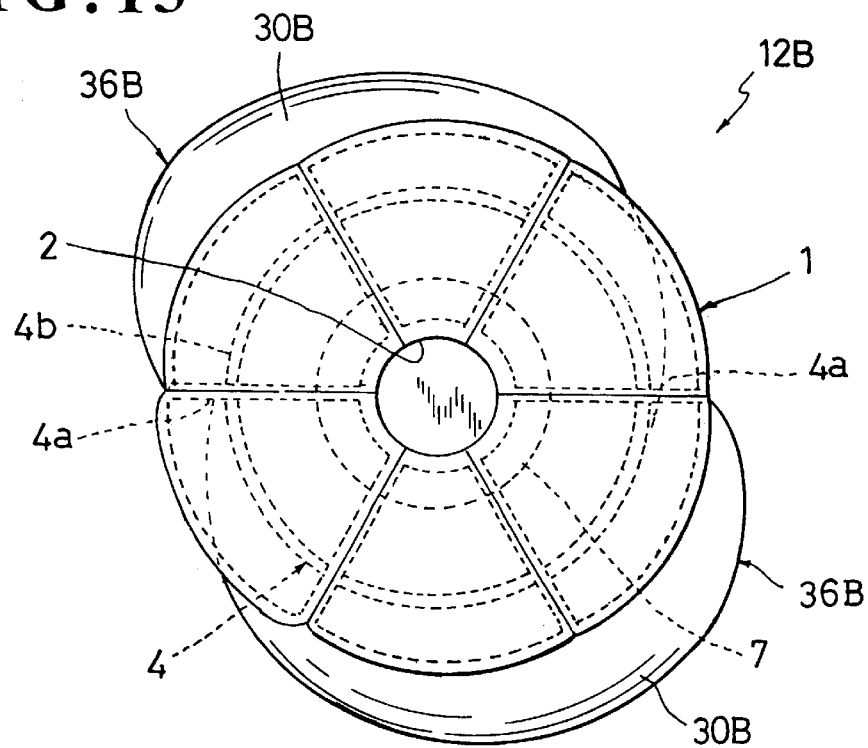
FIG. 13 is a top view showing a third embodiment of the present invention.
Figure 14:
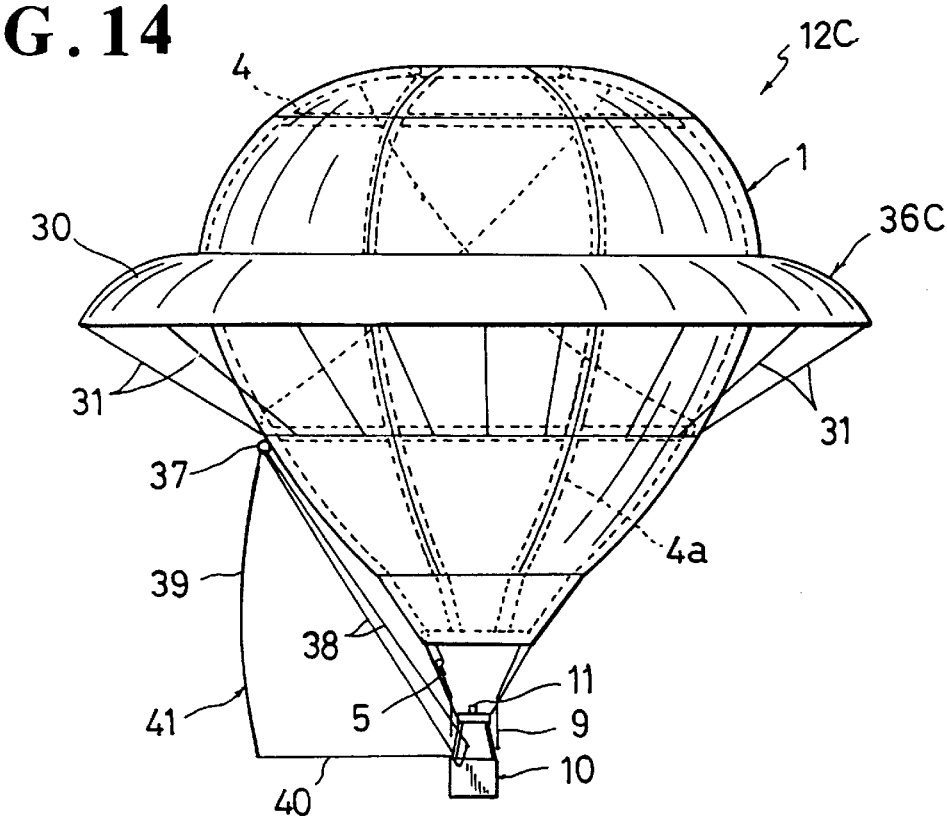
FIG. 14 is a side view showing a fourth embodiment of the present invention.
Figure 15:
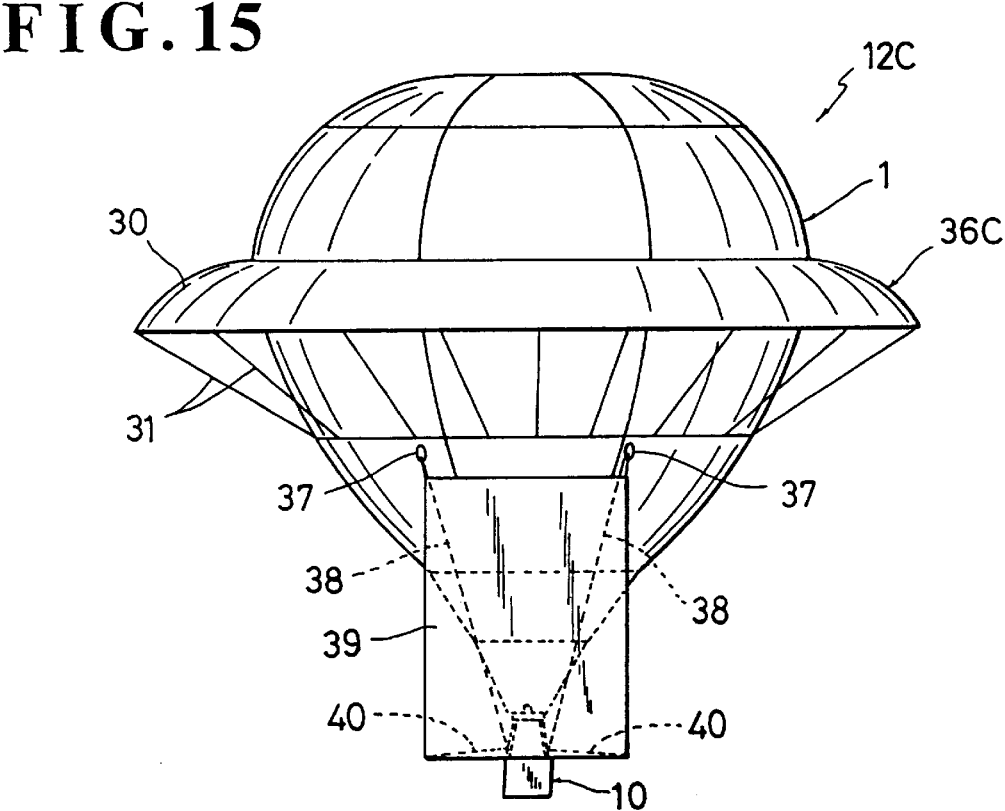
FIG. 15 is a front view showing a fourth embodiment of the present invention.
Figure 16:
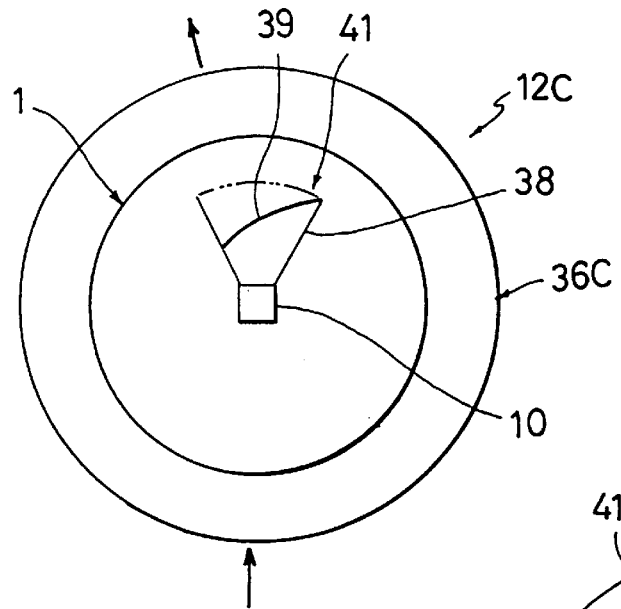
FIG. 16 is an explanatory top view on condition of a fall to the left showing a fourth embodiment of the present invention.
Figure 17:
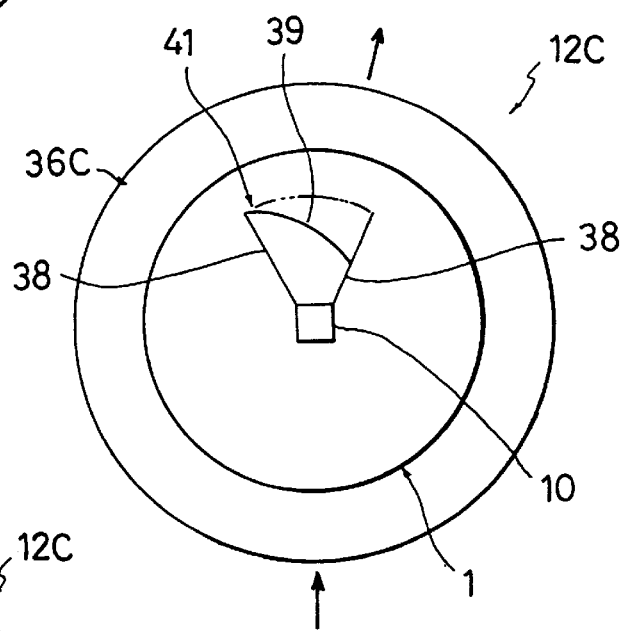
FIG. 17 is an explanatory top view on condition of a fall to the right showing a fourth embodiment of the present invention.
Figure 18:
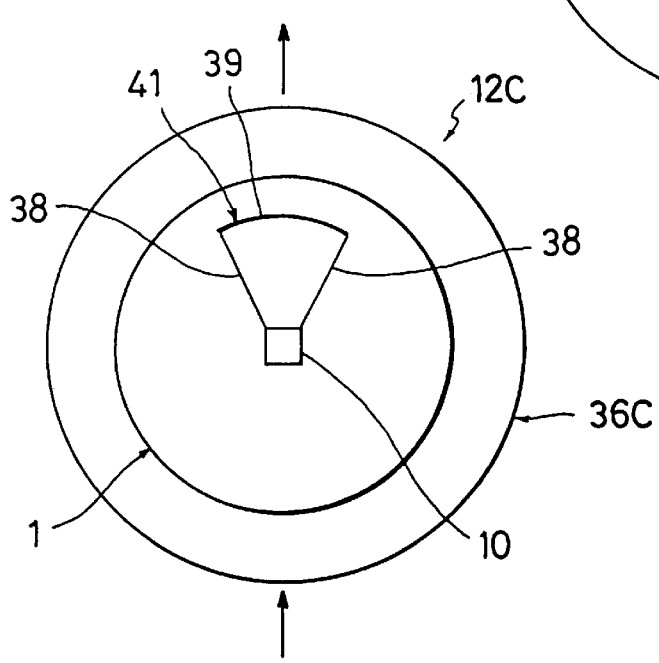
FIG. 18 is an explanatory top view on condition of a fall in front showing a fourth embodiment of the present invention.
Figure 19:
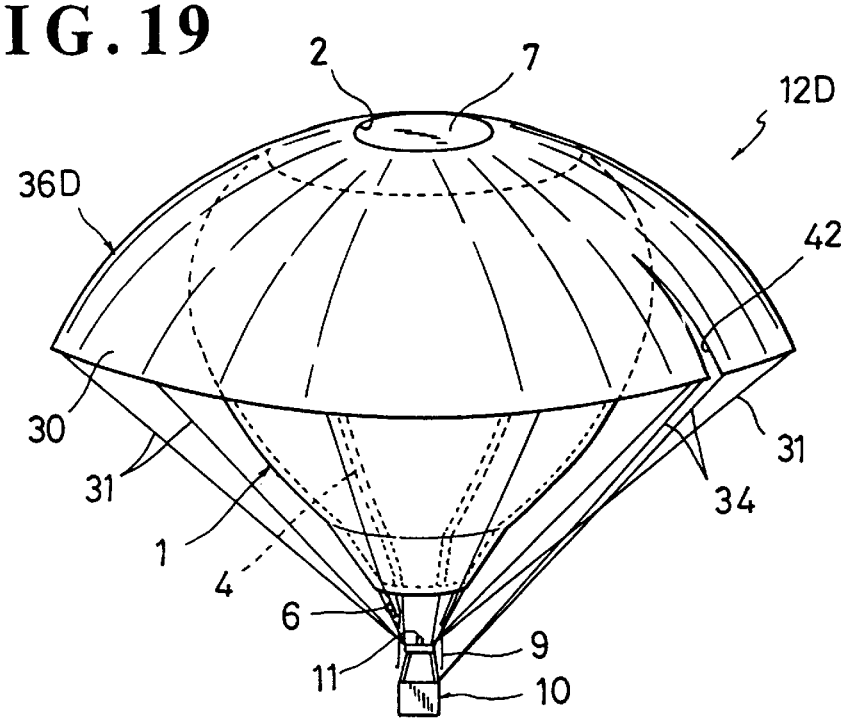
FIG. 19 is a front view showing a fifth embodiment of the present invention.
Figure 20:
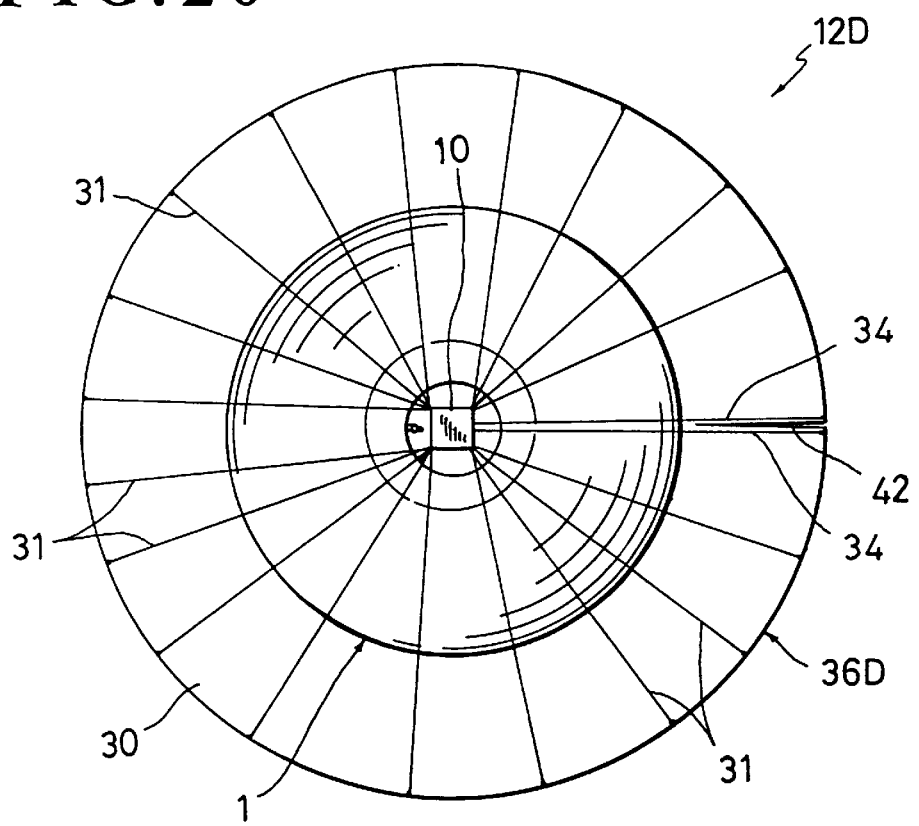
FIG. 20 is a top view showing a fifth embodiment of the present invention.
Figure 21:
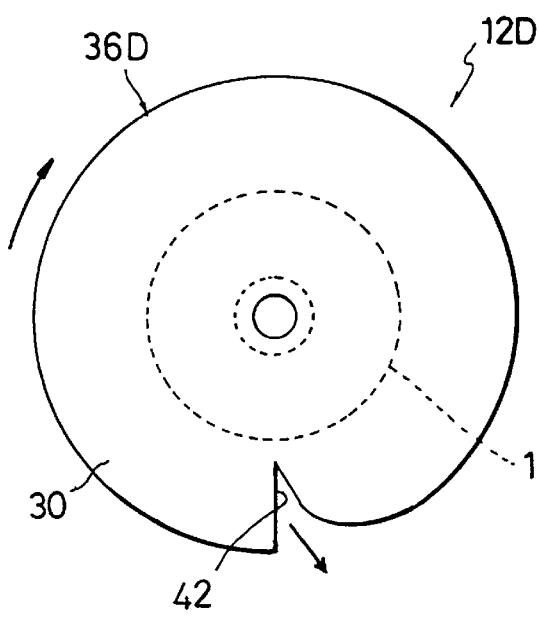
FIG. 21 is an explanatory top view on condition of a fall with clockwise turning.
Figure 22:
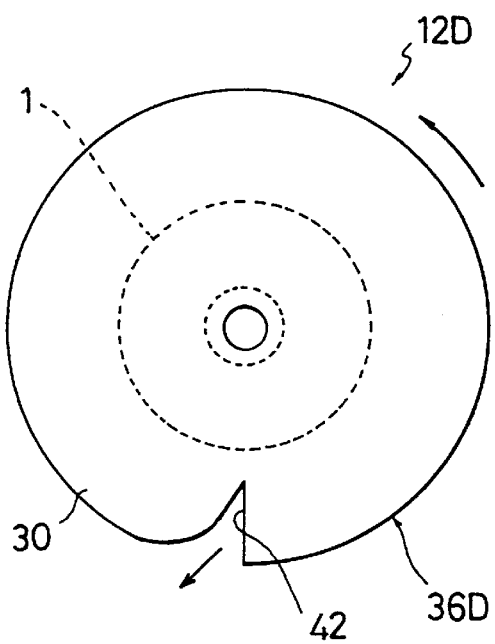
FIG. 22 is an explanatory top view on condition of a fall with anti-clockwise turning.
Figure 23:
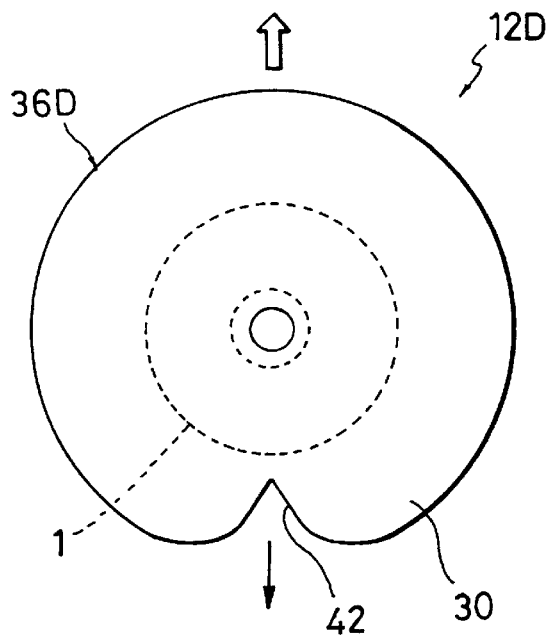
FIG. 23 is an explanatory top view on condition of a fall in front.
Figure 24:
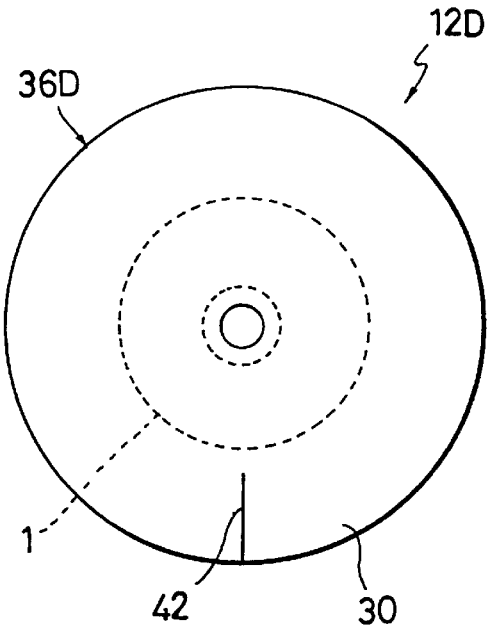
FIG. 24 is an explanatory top view on condition of a fall downwardly.

A third embodiment of the present invention shown in FIGS. 12 to 13 is distinguished from the second embodiment by the fact that the spiral parachute 36A is replaced with another type in the form of a pair of parachutes 36B, 36B. The pair of parachutes 36B, 36B is comprised of two parachute bodies in the shape of arcs 30B, 30B. The parachute bodies 30B, 30B are fixed by sewing on the facing places of an outer part of the envelope 1. A parachute balloon 12B with the pair of parachutes 36B, 36B according to the third embodiment will provide the same effects as the second embodiment.

A fourth embodiment of the present invention FIGS. 14 to 18 is distinguished from the first embodiment by the fact that a parachute in the shape of skirt 36C and a sail running device 41 is attached to the parachute balloon 12. The parachute in the of skirt shape 36C is attached in a position nearly in a center of an outer part of the envelope 1. Additionally, the sail running device 41 comprises a pair of O-rings or small pullies, the O-rings 37, 37 being selected in this embodiment, a pair of operation ropes 38, 38, a sail 39, and sail supporting ropes 40, 40. The O-rings 37, 37 are attached to a part lower than the center part on the envelope 1 at fixed spaces. The ends of the pair of operation ropes 38, 38 are connected to the gondola 10 through the O-rings 37, 37. The upper part of sail 39 is attached to the ends of operation ropes 38, 38. One of the ends of each of the sail support ropes 40, 40 is attached to each of both side ends of the bottom of the sail 39, and the other ends of the sail support ropes 40, 40 are attached to the gondola 10. A parachute balloon 12C with the parachute in the shape of a skirt 36C and the sail running device 41 according to the fourth embodiment will provide the same effects as the first embodiment.

Accordingly, the parachute balloon 12C can fall slowly by using the parachute 36C; can be flown right and left when either of the operation ropes 38, 38 of the sail running device 41 is loosened; can be traveled by the sail 39 with wind when the sail 39 is suspended by the pulling up to both of operation ropes 38, 38; and can be flown independent of the sail 39 which is folded by the lengthening of both of the operation ropes 38, 38 when the contrary wind rises, or the sail 39 is not used.

A fifth embodiment of the present invention shown in FIGS. 19 to 24 is distinguished from the first embodiment by the fact that the parachute 36 is replaced with another type in the form of a parachute 36D in the shape of an umbrella, and the operation ropes 34, 34 are attached thereto. The parachute in the shape of an umbrella 36D is attached to the envelope 1 and is provided with a slit 42 for the control of device for the direction of descent at outer part of a parachute body 30C thereof. The operation ropes 34, 34 are attached to the part a little to the end of the slit 42. Moreover, the slit 42 can be opened by the operation ropes 34,34, and are operated from the gondola 10. A parachute balloon 12D according to the fifth embodiment will provide the same effects as the first embodiment.

Figure 25:
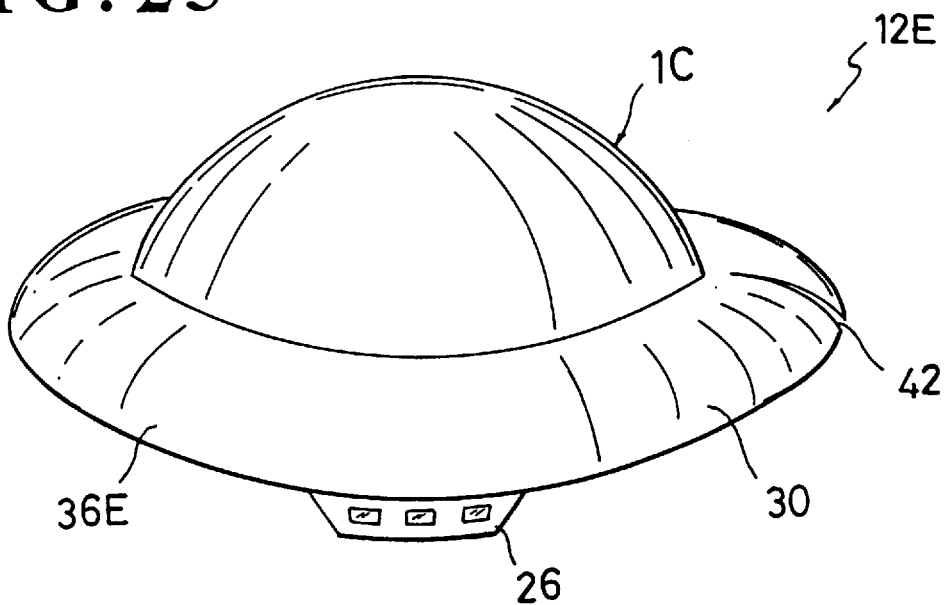
FIG. 25 is a perspective view showing a sixth embodiment of the present invention.
Figure 26:
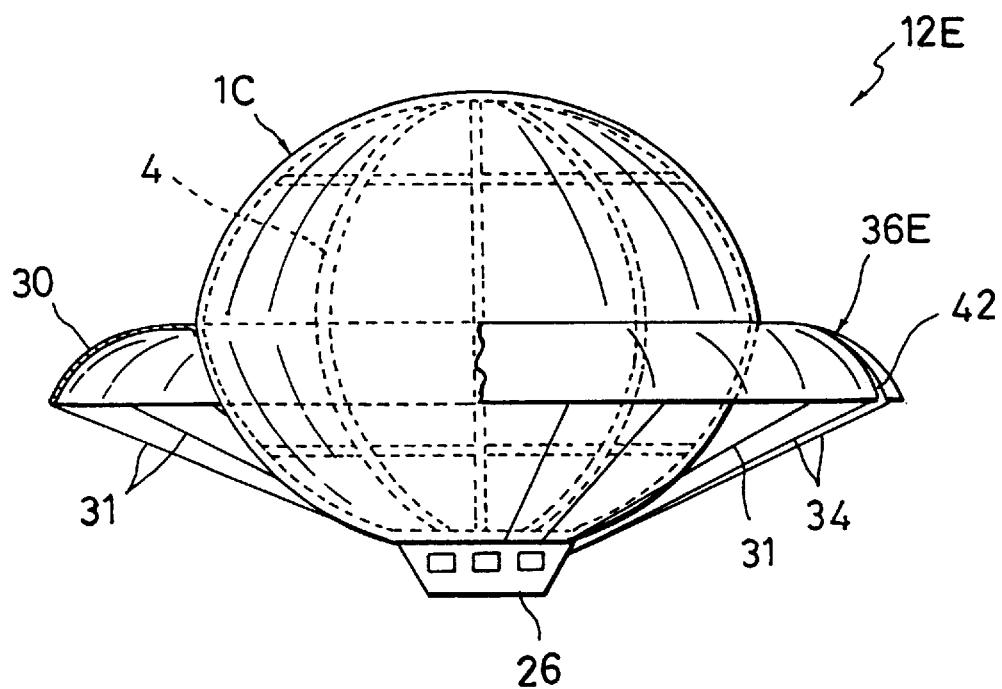
FIG. 26 is a partly sectional front view showing a sixth embodiment of the present invention.

A sixth embodiment of the present invention shown in FIGS. 25 to 26 is distinguished from the fifth embodiment by the fact that the parachute 36D is replaced with another type in the form of a parachute 36E in the shape of a brim of a hat. Also the parachute 36E is attached to a nearly center part of the envelope 1C in the shape of balloon ship with a slightly flattened spherical shape. A parachute balloon 12E with the balloon-ship in the traditionally imagined a shape of a UFO according to the sixth embodiment will provide the same effects as the fifth embodiment.

Figure 27:
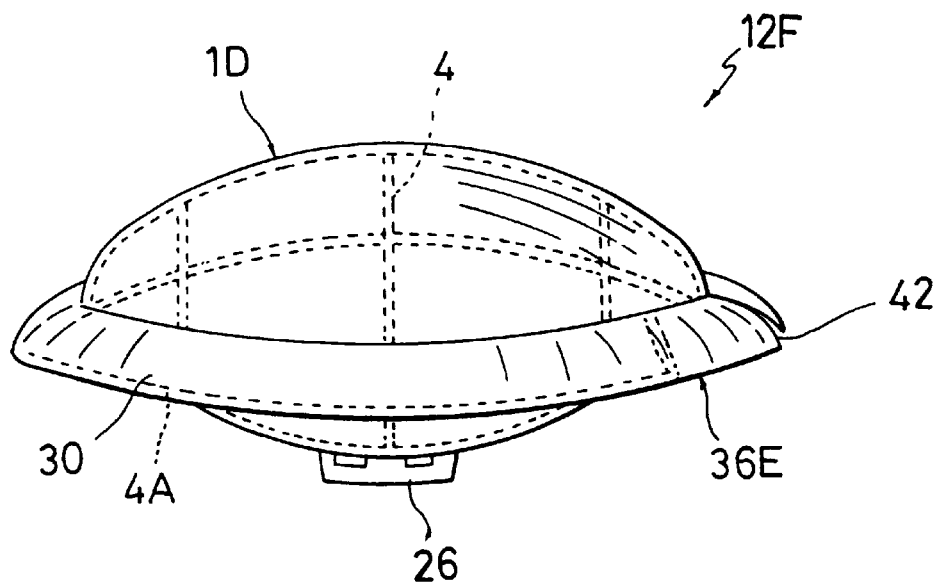
FIG. 27 is a perspective view showing a seventh embodiment of the present invention.
Figure 28:
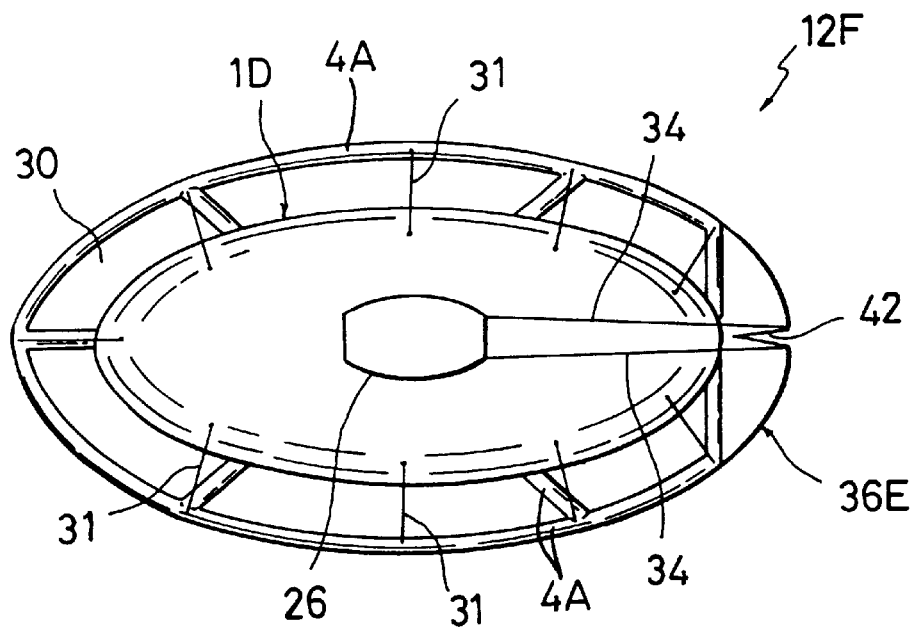
FIG. 28 is a bottom view showing a seventh embodiment of the present invention.

A seventh embodiment of the present invention shown in FIGS. 27 to 28 is distinguished from the sixth embodiment by the fact that the envelope 1C is replaced with another type in the form of an envelope 1D in the shape of an oval. A parachute is 36E attached to the outer part of the envelope 10, having a contractile gas tube 4A. A parachute balloon 12F with the envelope 1D according to the seventh embodiment will provide the same effects as the sixth embodiment. Additionally, the contractile gas tube 4A thereof may be formed separately of the contractile gas tube 4 of the envelope 10, and may be formed as to pass through the contractile gas tube 4.

Figure 29:
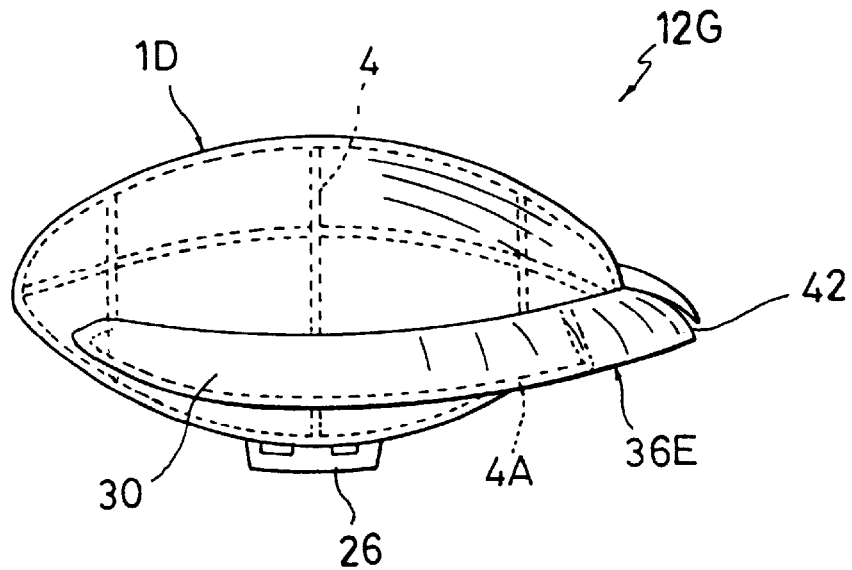
FIG. 29 is a perspective view showing an eighth embodiment of the present invention.
Figure 30:
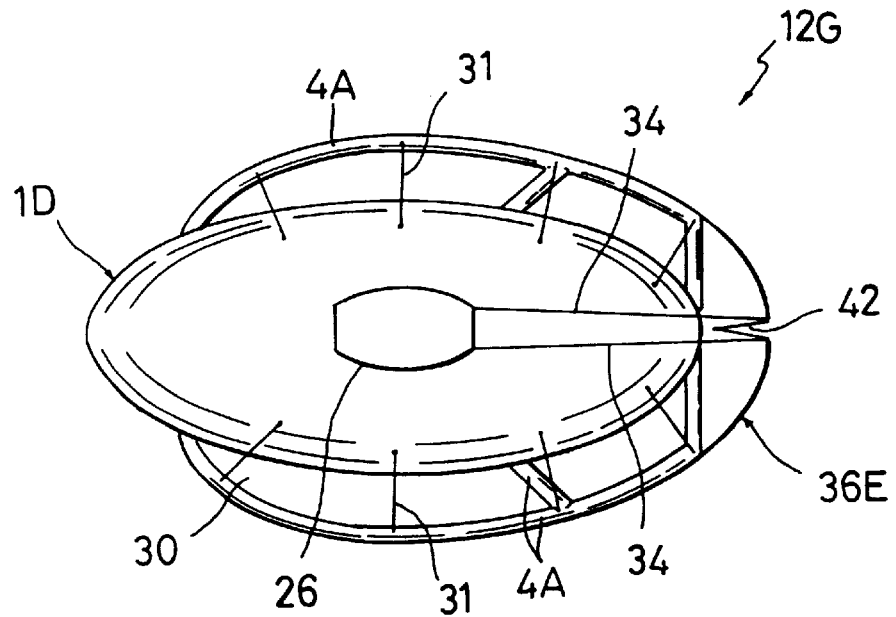
FIG. 30 is a bottom view showing an eighth embodiment of the present invention.
Figure 31:
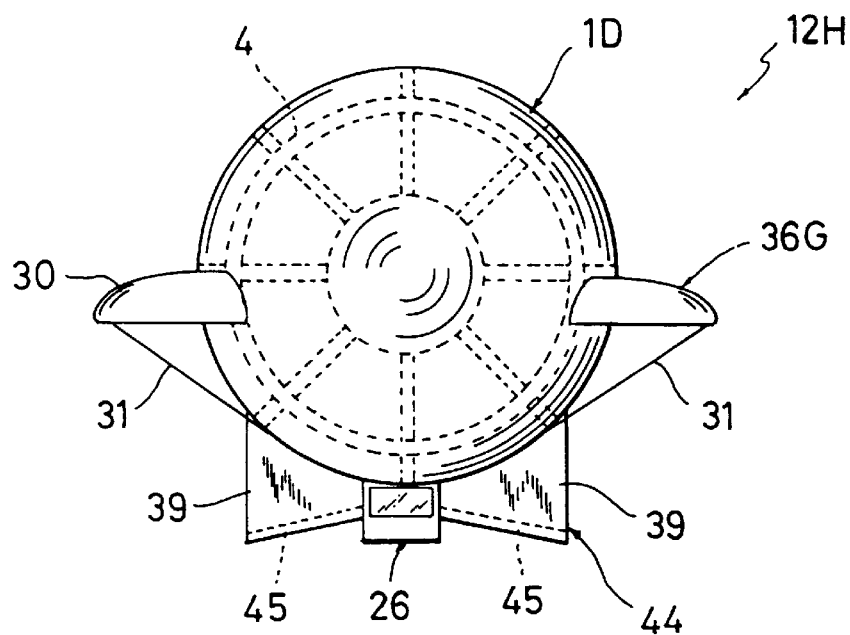
FIG. 31 is a front view showing a ninth embodiment of the present invention.
Figure 32:
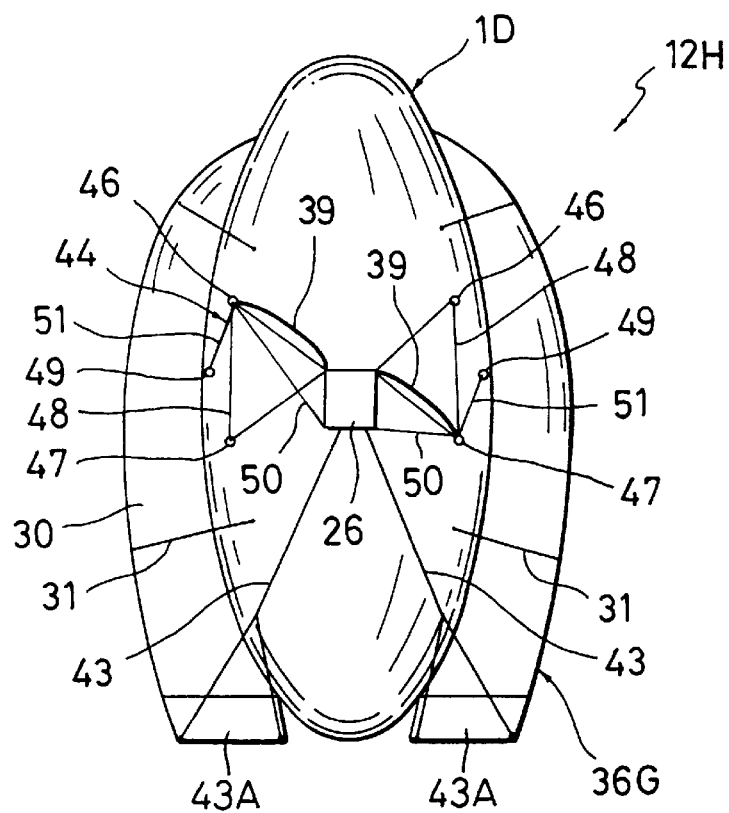
FIG. 32 is a bottom view showing a ninth embodiment of the present invention.
Figure 33:
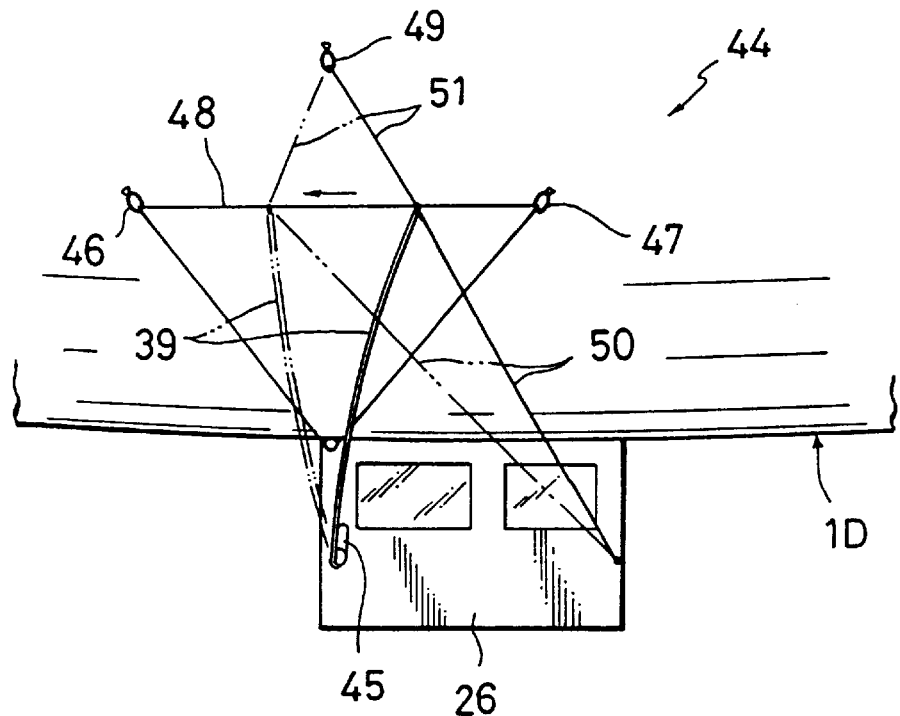
FIG. 33 is a side view showing a sail running device of a ninth embodiment of the present invention.
Figure 34:
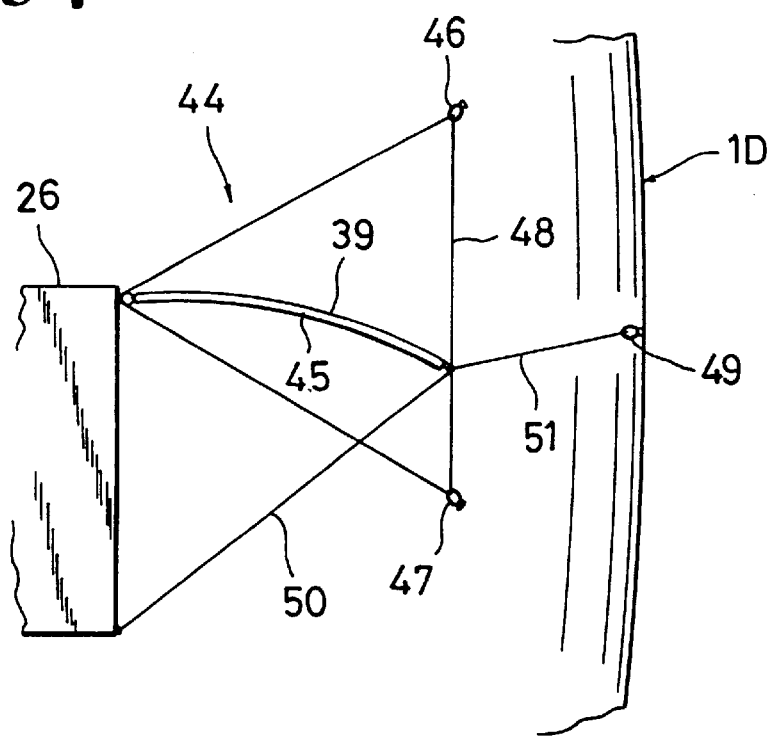
FIG. 34 is a bottom view showing a sail running device of a ninth embodiment of the present invention.

An eighth embodiment of the present invention shown in FIGS. 29 to 30 is distinguished from the seventh embodiment by the fact that a parachute 36F is attached to all but the tip part of the envelope 1D. A parachute balloon 12G with the parachute 36F according to the eighth embodiment can prevent collapse of the parachute 36F during the filling thereof.

A ninth embodiment of the present invention shown in FIGS. 31 to 34 is distinguished from the eighth embodiment by the fact that the parachute 36F is replaced with another type in the form of a parachute 36G, and a sail running device 44 attached thereto. The parachute 36G is attached to operation ropes 43, 43 connected with flaps 43A, 43A, the back end part thereof, which is able to control the failing direction by an operator from the gondola 26 in the shape of cabin separated from the envelope 1D. A parachute balloon 12H with the parachute 36G and the sail running device 44 according to the ninth embodiment permits control of the running and the direction of running.

Moreover, the sail running device 44 comprises sails 39, 39, front-rear rings 46, 47, 46 and 47 in left and right, operation ropes in the shape of loop 48, 48, left and right rings 49, 49, a pulling rope 50 and an opposite pulling rope 51 on the left, and a pulling rope 50 and an opposite pulling rope 51 on the right.

The bottom parts of the sails 39, 39 are reinforced by an air tube 45. The front-rear rings on the left and right 46, 47, 46 and 47 are attached to the front and rear parts of the envelope 1D on both sides of the gondola 26. The operation ropes in the shape of a loop 48, 48 pass through the front-rear rings on the left 46, 47 and the front-rear rings on the right 46, 47. Therefore, the operator can operate the sail 39 from the gondola 26 by using the operation ropes in the shape of a loop 48, 48. The left and right rings 49, 49 are attached to the envelope 1D in a place corresponding to the outer part of the front-rear rings 46, 47, 46 and 47 on the left and right. The pulling rope 50 on the left is attached to the operation rope 48 provided between the front-rear ring 46 and 47 on the left, and the opposite pulling rope 51 passes through the left ring 49 and is pulled to the opposite side of the gondola 26. The pulling rope 50 on the right is attached to the operation rope 48 provided between the front-rear ring 46 and 47 in right and the opposite pulling rope 51 passes through the right ring 49 and is pulled to the opposite side of the gondola 26.

Figure 35:
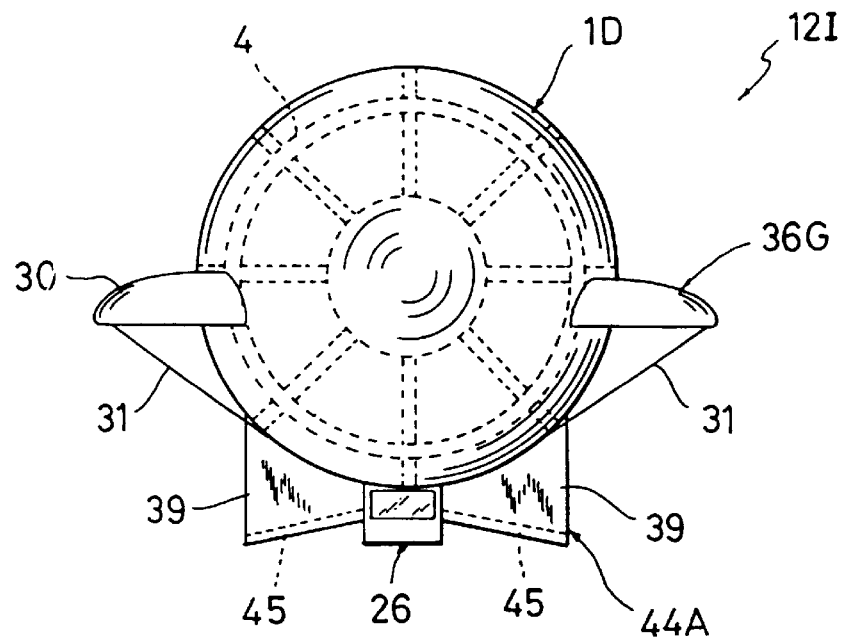
FIG. 35 is a front view showing a tenth embodiment of the present invention.
Figure 36:
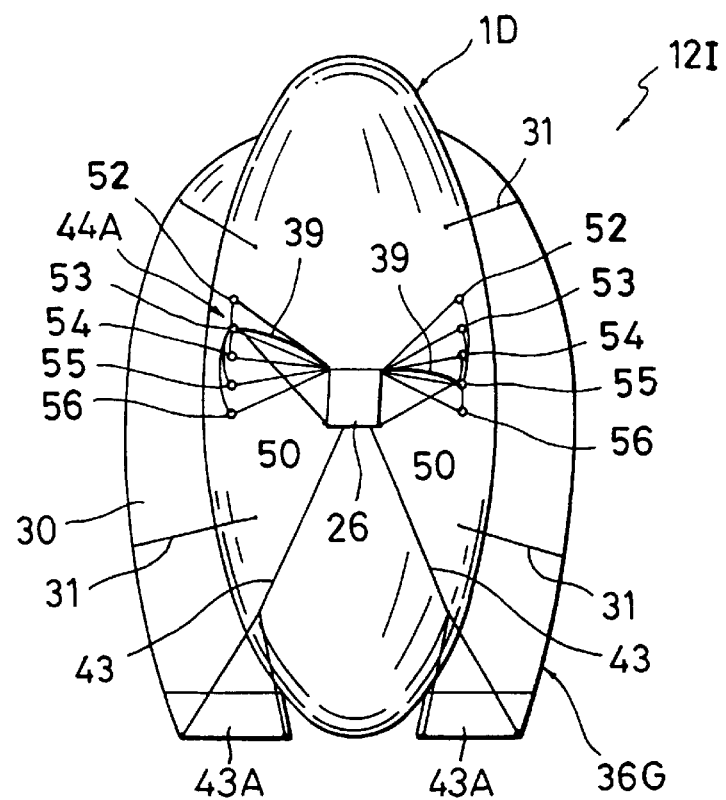
FIG. 36 is a bottom view showing a tenth embodiment of the present invention.
Figure 37:
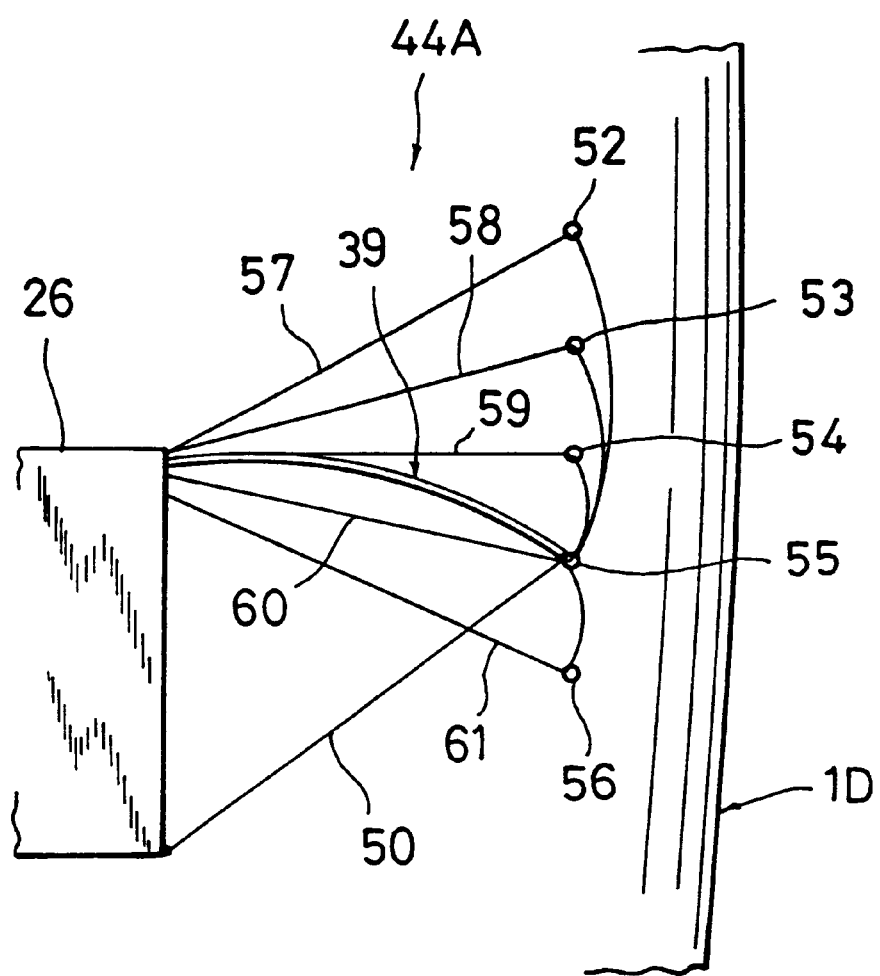
FIG. 37 is a bottom view showing a sail running device of a tenth embodiment of the present invention.

A tenth embodiment of the present invention shown in FIGS. 35 to 37 is distinguished from the ninth embodiment by the fact that the sail running device 44 is replaced with another like a sail running device 44A which comprises a plurality of rings, that is, five left and right rings 52, 53, 54, 55 and 56, and operation ropes 57, 58, 59, 60 and 61. Five left and right rings 52, 53, 54, 55 and 56 are provided on the envelope 1D in corresponding positions in front and rear parts at the both sides of the gondola 26. The operation ropes 57, 58, 59, 60 and 61 pass through the left-right rings 52, 53, 54, 55 and 56, and are attached to the end of the sails 39, 39. A parachute balloon 121 with the sail running device 44A according to the tenth embodiment will provide the same effete as the ninth embodiment, and moreover, the parachute balloon 121 permits the position of the sails 39, 39 to be changed when the operator pulls any of the five operation ropes 57, 58, 59, 60 and 61 on the left and right, and other operation ropes are loosened.

Figure 38:
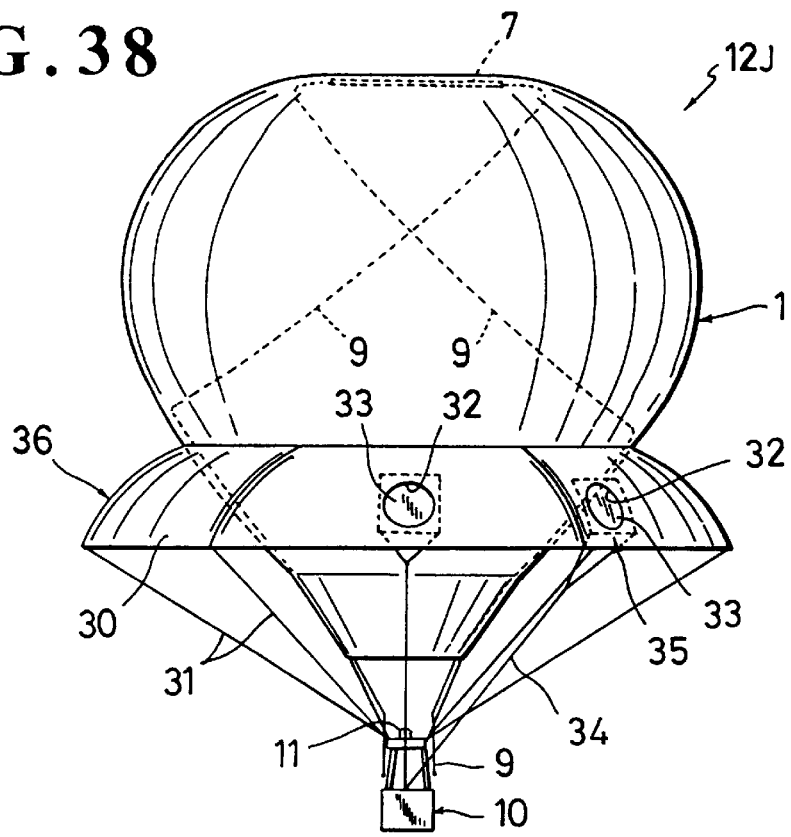
FIG. 38 is a front view showing an eleventh embodiment of the present invention.
Figure 39:
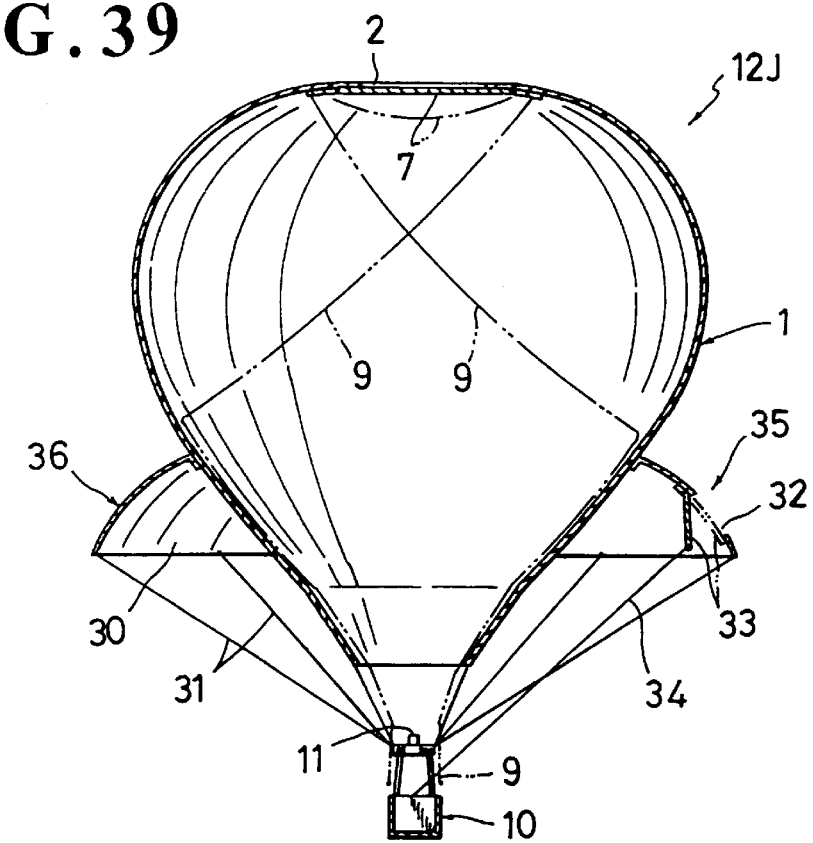
FIG. 39 is a cross sectional view showing an eleventh embodiment of the present invention.

An eleventh embodiment of the present invention FIGS. 38 to 39 is distinguished from the first embodiment by the fact that the envelope 1, the same as described previously is used, however without the flexible gas storage tube 4 as the frame. A parachute balloon 12J according to the eleventh embodiment will provide the same effects as the first embodiment.

Figure 40:
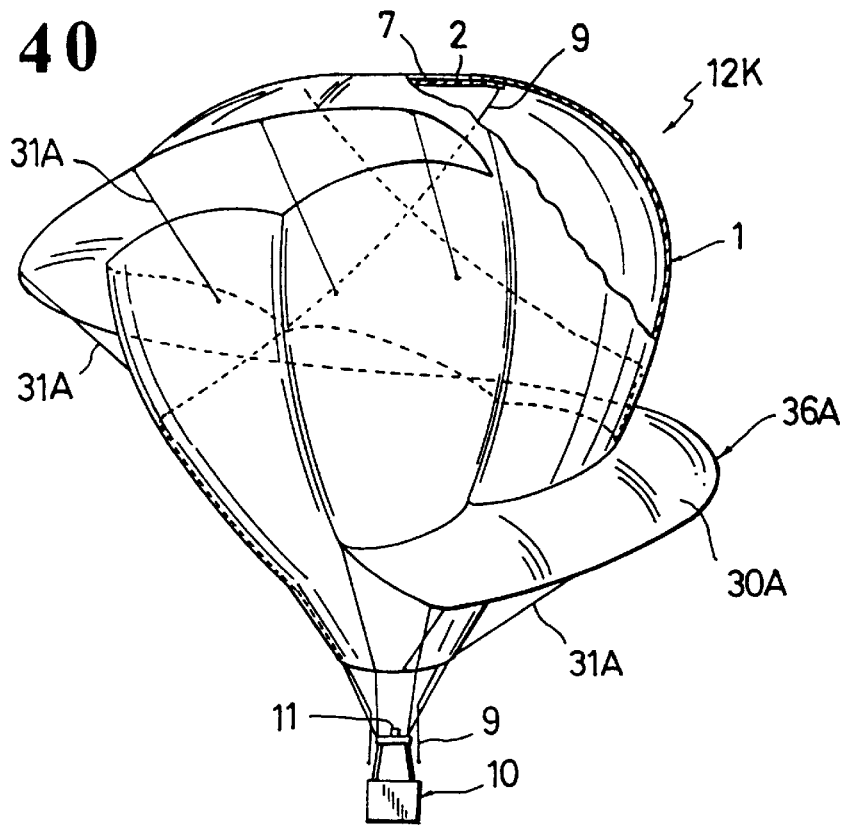
FIG. 40 is a partly sectional front view showing a twelfth embodiment of the present invention.

A twelfth embodiment of the present invention shown in FIG. 40 is distinguished from the second embodiment by the fact that the envelope 1, the same as described previously, is provided however without the flexible gas storage tube 4 as the frame. A parachute balloon 12K according to the twelfth embodiment will provide the same effects as the second embodiment.

Figure 41:
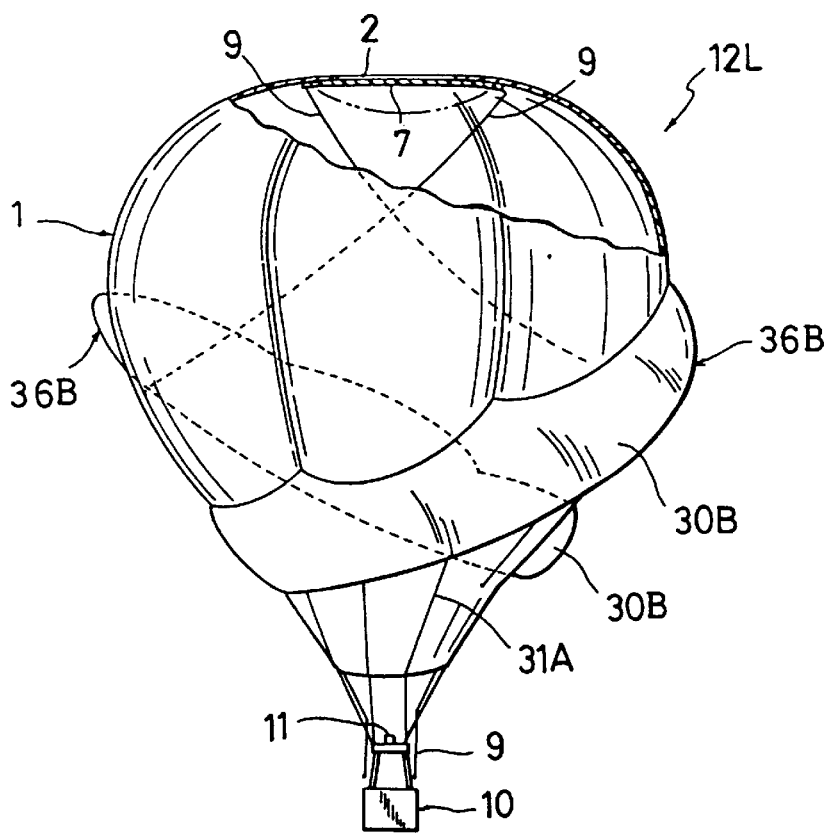
FIG. 41 is a partly sectional front view showing a thirteenth embodiment of the present invention.

A thirteenth embodiment of the present invention shown in FIG. 41 is distinguished from the third embodiment by the fact that the envelope 1, the same as described previously, is provided however without the flexible gas storage tube 4 as the frame. A parachute balloon 12L according to the thirteenth embodiment will provide the same effects as the third embodiment.

Figure 42:
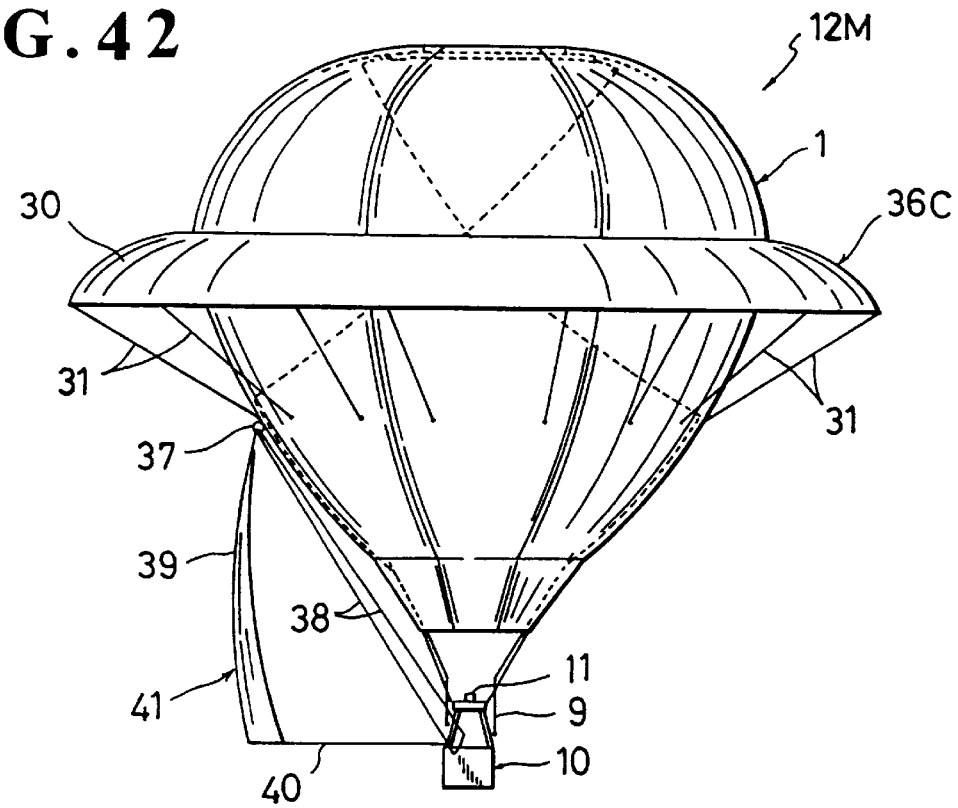
FIG. 42 is a front view showing a fourteenth embodiment of the present invention.

A fourteenth embodiment of the present invention shown in FIG. 42 is distinguished from the fourth embodiment by the fact that the envelope 1, the same as described previously, is however provided without the flexible gas storage tube 4 as the frame is used. A parachute balloon 12M according to the fourteenth embodiment will provide the same effects as the fourth embodiment.

Figure 43:
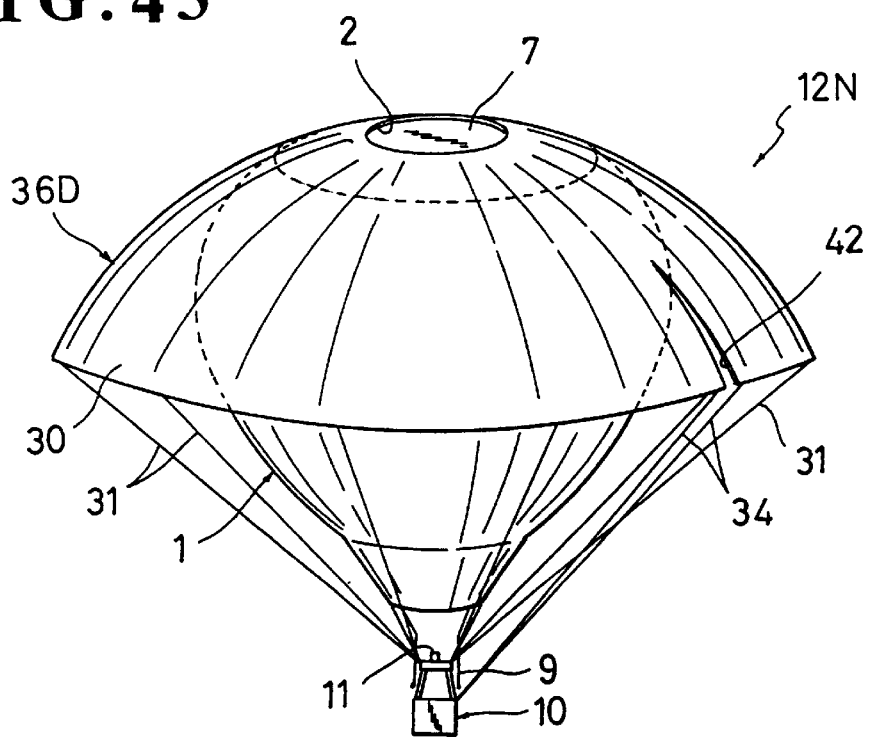
FIG. 43 is a front view showing a fifteenth embodiment of the present invention.

A fifteenth embodiment of the present invention shown in FIG. 43 is distinguished from the fifth embodiment by the fact that the envelope 1, the same as described previously, is however provided without the flexible gas storage tube 4 as the frame is used. A parachute balloon 12N according to the fifteenth embodiment will provide the same effects as the fifth embodiment.

Figure 44:
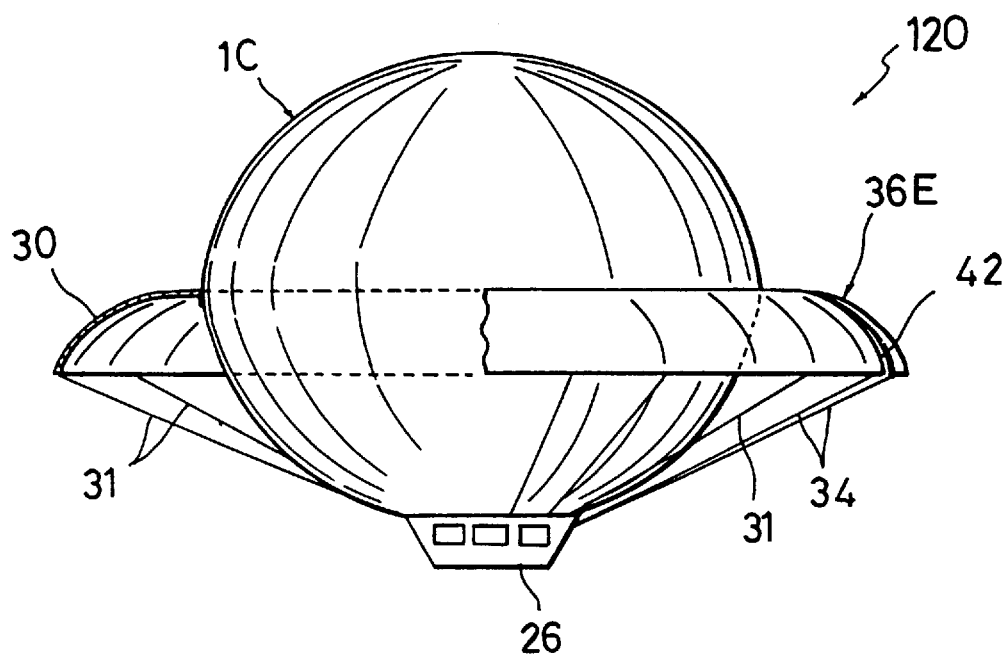
FIG. 44 is a partly sectional front view showing a sixteenth embodiment of the present invention.

A sixteenth embodiment of the present invention shown in FIG. 44 is distinguished from the sixth embodiment by the fact that the envelope 1, the same as described previously, is however provided without the flexible gas storage tube 4 as the frame. A parachute balloon 12O according to the sixteenth, embodiment will provide the same effects as the sixth embodiment.

Figure 45:
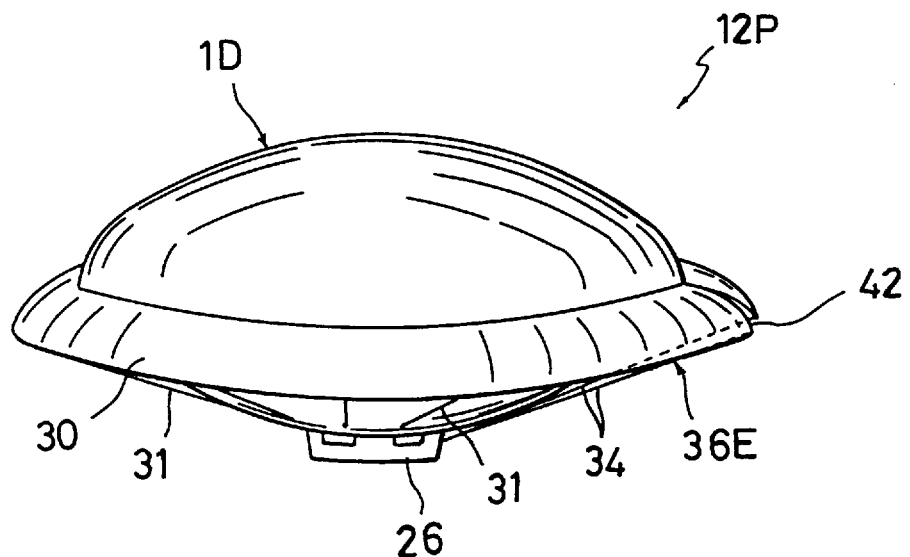
FIG. 45 is a perspective view showing a seventeenth embodiment of the present invention.

A seventeenth embodiment of the present invention shown in FIG. 45 is distinguished from the seventh embodiment by the fact that the envelope 1, the same as described previously, is provided however without the flexible gas storage tube 4 as a frame. A parachute balloon 12P according to the seventeenth embodiment will provide the same effects as the seventh embodiment.

Figure 46:
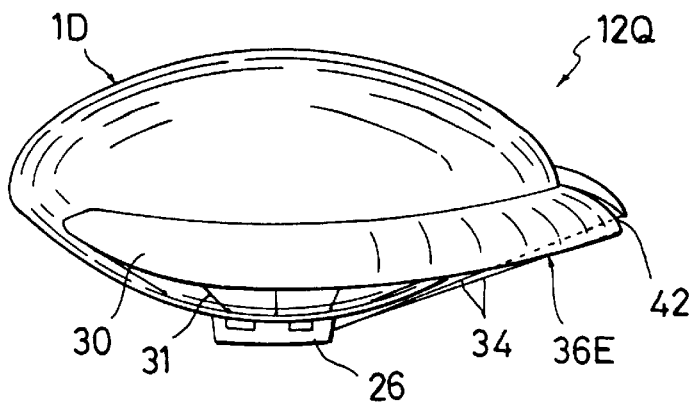
FIG. 46 is a perspective view showing an eighteenth embodiment of the present invention.

An eighteenth embodiment of the present invention shown in FIG. 46 is distinguished from the eighth embodiment by the fact that the envelope 1, the same as described previously, is however provided without the flexible gas storage tube 4 as a frame. A parachute balloon 12Q according to the eighteenth embodiment will provide the same effects as the eighth embodiment.

Figure 47:
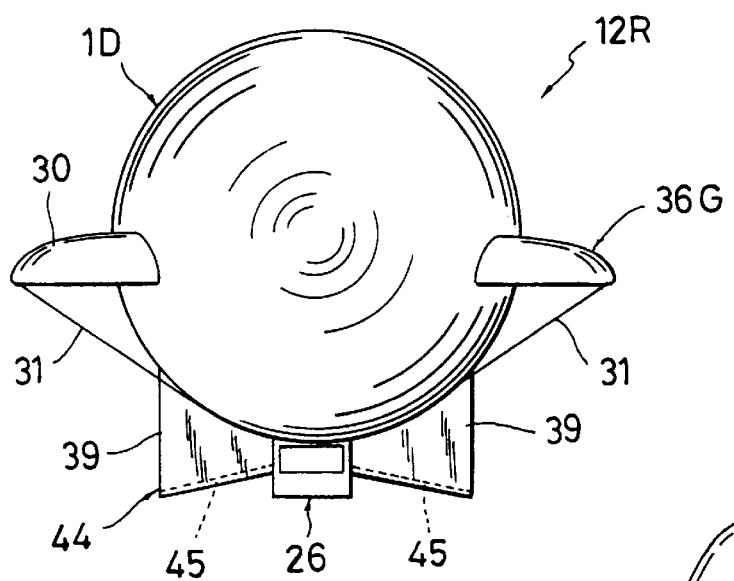
FIG. 47 is a front view showing a nineteenth embodiment of the present invention.
Figure 48:
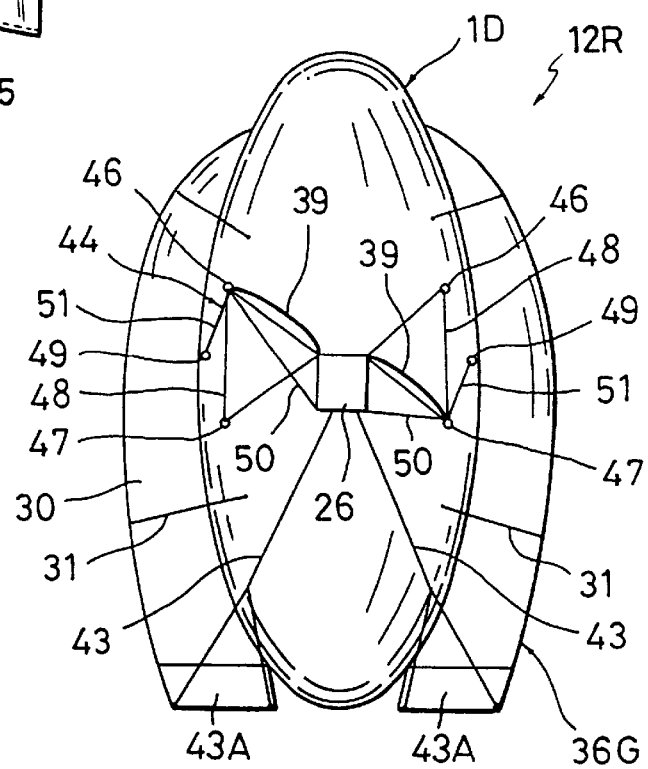
FIG. 48 is a bottom view showing a nineteenth embodiment of the present invention.

A nineteenth embodiment of the present invention shown in FIGS. 47 to 48 is distinguished from the ninth embodiment by the fact that the envelope 1, the same as described previously, is however provided without the flexible gas storage tube 4 as a frame. A parachute balloon 12R according to the nineteenth embodiment will provide the same effects as the ninth embodiment.

Figure 49:
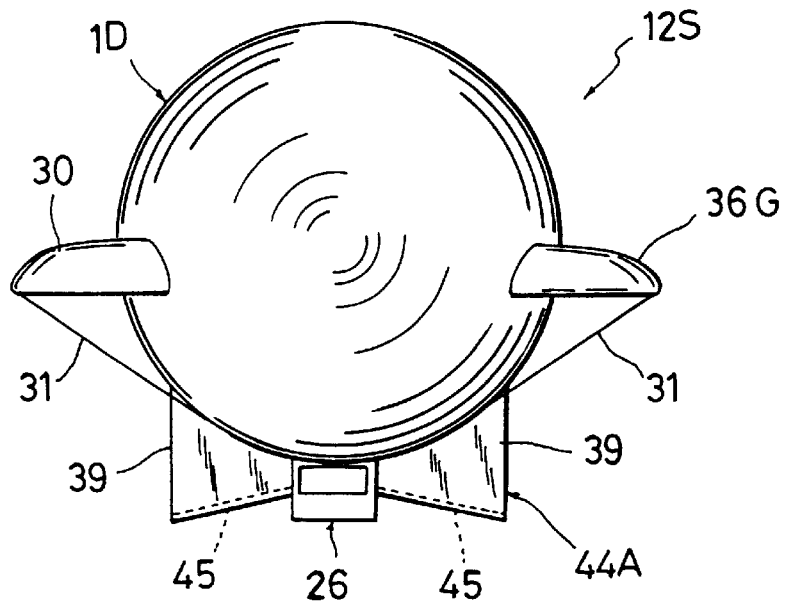
FIG. 49 is a front view showing a twentieth embodiment of the present invention.
Figure 50:
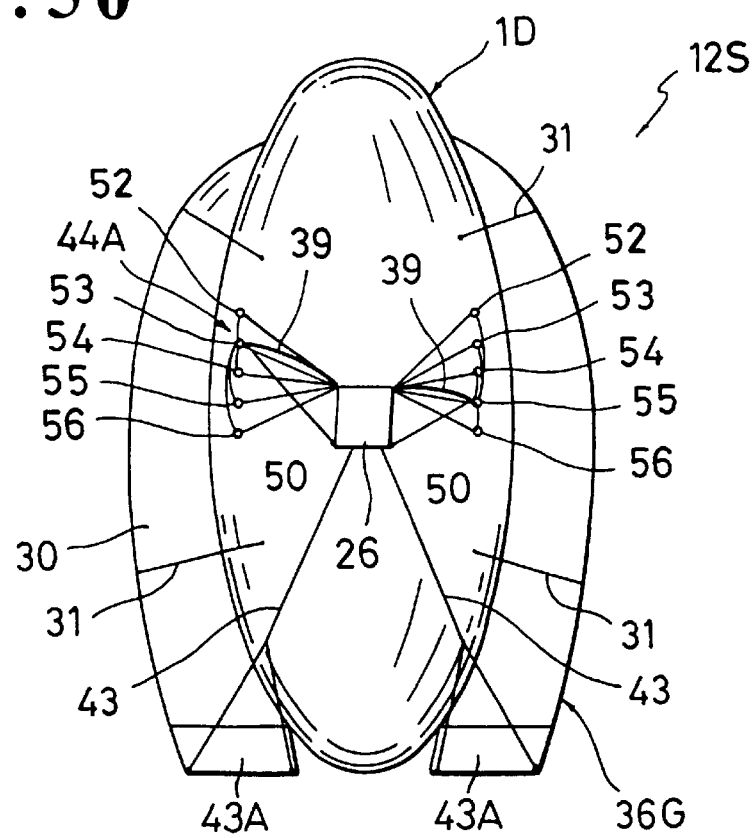
FIG. 50 is a bottom view showing a twentieth embodiment of the present invention.

A twentieth embodiment of the present invention shown in FIGS. 49 to 50 is distinguished from the tenth embodiment by the fact that the envelope 1, the same as described previously, is however provided without the flexible gas storage tube 4 as a frame. A parachute balloon 12S according to the twentieth embodiment will provide the same effects as the tenth embodiment.

Figure 51:
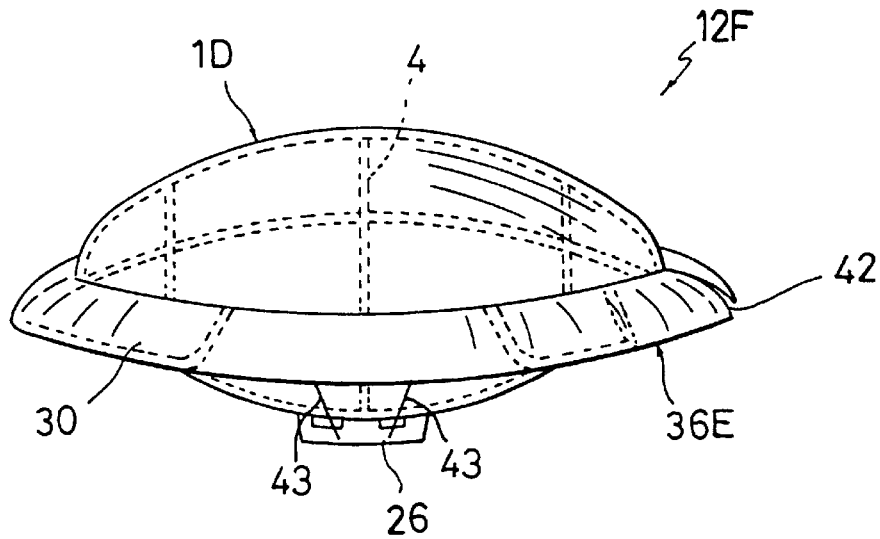
FIG. 51 is a front view showing a twenty first embodiment of the present invention.
Figure 52:
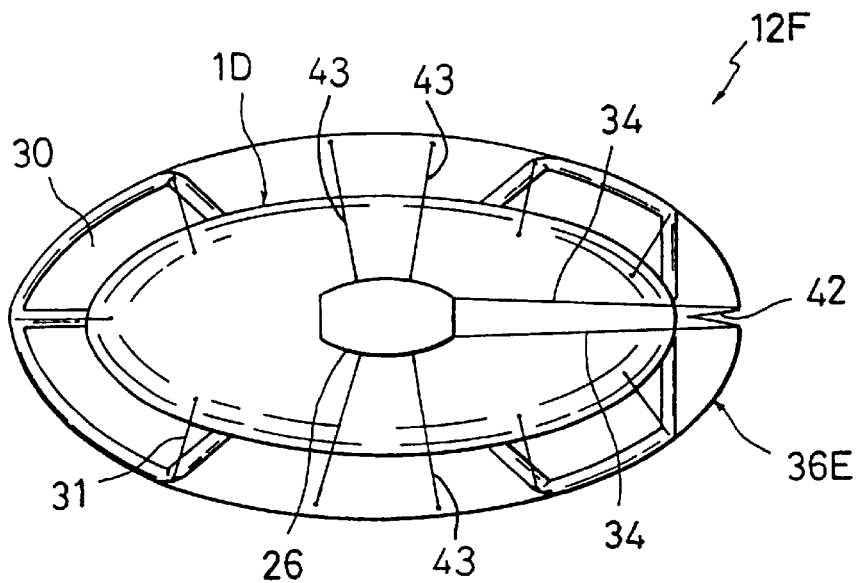
FIG. 52 is a bottom view showing a twenty first embodiment of the present invention.

A twenty first embodiment of the present invention shown in FIGS. 51 to 52 is distinguished from the seventh embodiment by the fact that the parachute 36E having the contractile gas tube 4A is attached to part of the envelope 1 except for the center part of both sides thereof and a plurality of operation ropes 43, 43 is attached, one end of the each of the operation ropes being attached to the outer part of center part of both sides of the parachute 36E, permitting the operation ropes 43 to be pulled by an operator from the gondola 26. A parachute balloon 12T having such modifications allows control of the falling direction by pulling of the operation ropes 43,43 from the gondola 26.

As set forth above, the advantages of the present invention are as follows:

(1) A parachute balloon of the present invention comprises: an envelope in the shape of balloon or airship, capable of being collapsed and readily stored during periods of nonuse; a gondola attached to the bottom part of the envelope; and a parachute attached to the envelope. Accordingly, the parachute balloon can descend safely and slowly because the parachute is opened during a fall without using of any peculiar power devices.

(2) As discussed above, the parachute balloon can be floated and flown up for a desired period, and the envelope of the parachute balloon can then be collapsed and stored during periods of nonuse. Additionally, it can be stored in a compact space.

(3) Because the parachute balloon is comprised a flexible gas storage tube attached to the envelope to maintain the inflated condition of the envelope and includes a supply-hold device for gas such as air, helium or hydrogen into the gas storage tube, the envelope can be maintained the inflated condition because the flexible gas storage tube is supplied with gas and inflated, as noted above. Therefore, the envelope can be inflated easily and simply.

In accordance with the invention, when gas within the gas storage tube is pulled out, the envelope can be collapsed and stored, and kept in a small space as the same used previously. As noted above, the parachute balloon in accordance with the invention can greatly improve the flight performance and the resistance against wind and is able to still have sturdiness in spite of its simple structure and light weight.

Moreover, the parachute balloon can be manufactured easily because its structure is simple. Additionally, a parachute balloon using a burner, such as in the form of a hot-air balloon, can be used safely with the burner since the mouth is opened reliably by the gas storage tube.

I claim:

1. An aircraft comprising:

an inflatable envelope capable of being collapsed and stored during periods of nonuse;

a gondola mounted to a lower part of said envelope;

a parachute which is attached to said envelope; and a control device for controlling a direction of travel during a descent, said control device permitting selective reduction of upwardly directed air resistance against said parachute by venting of air through said parachute at at least one position therealong.

2. An aircraft according to claim 1, wherein said envelope is comprised of a flexible gas storage tube including means for maintaining an inflated condition thereof, and a supply-hold device including means for selectively permitting supply of gas into said flexible gas storage tube and holding same therein.

3. An aircraft according to claim 1, wherein the parachute is comprised of a flexible gas storage tube including means for maintaining an expanded condition thereof, and a supply-hold device including means for selectively permitting supply of gas into said flexible gas storage tube and holding same therein.

4. An aircraft according to claim 1, wherein said parachute is in the shape of a skirt, said parachute being sewn on approximately a center part of said envelope with an inner part thereof.

5. An aircraft according to claim 1, wherein said parachute includes a pair of sub-parachutes each in the shape of an arc, each of said pair of sub-parachutes being sewn on an opposite part of an outer part of said envelope at a vertical angle, whereby said envelope turns during a descent.

6. An aircraft according to claim 1, wherein said parachute is in the shape of umbrella, said parachute being sewn on an upper part of said envelope.

7. An aircraft comprising:

an inflatable envelope capable of being collapsed and stored during periods of nonuse;

a gondola attached to a lower part of said envelope; and a parachute attached to said envelope, said parachute being in the shape of a spiral, said parachute being sewn on an outer part of said envelope with an inner part thereof.

8. An aircraft comprising:

an inflatable envelope capable of being collapsed and stored during periods of nonuse;

a gondola mounted to a lower part of said envelope;

a parachute which is attached to said envelope; and a control device for controlling a direction of travel during a descent which is attached to said parachute, said control device comprising two air vents which are mounted a little to one side of said parachute, two open-close valves capable of opening and closing said two air vents, and two operation ropes capable of opening and closing said two open-close valves by operation from said gondola.

9. An aircraft comprising:

an inflatable envelope capable of being collapsed and stored during periods of nonuse;

a gondola mounted to the lower part of said envelope;

a parachute which is attached to said envelope; and a control device for controlling a direction of travel during a descent which is attached to said parachute, said control device comprising an opening which is attached to one end of the outer part of said parachute, and two operation ropes which are mounted to both tip parts of said opening, capable of opening and closing said opening by said operation ropes from said gondola.

10. An aircraft comprising:

an inflatable envelope capable of being collapsed and stored during periods of nonuse;

a gondola mounted to a lower part of said envelope;

a parachute attached to said envelope; and a sail running device, one end part of which is attached to said envelope and another end part which is attached to said gondola, said sail running device including a sail supported from said gondola at opposed sides of a lower portion thereof, said sail running device further including suspension means operable from said gondola for raising said sail, said suspension means being attached to said sail at opposed sides of an upper portion thereof, said sail when in a raised position being oriented crosswise a direction of a wind blowing from a direction opposite a side of said envelope on which said sail running device is disposed.

11. An aircraft according to claim 10, wherein said envelope is comprised of a flexible gas storage tube including means for maintaining an inflated condition of said envelope, and a supply-hold device including means for selectively permitting supply of gas into said flexible gas storage tube and holding same therein.

12. An aircraft according to claim 10, wherein said parachute is in the shape of a skirt, said parachute being sewn on approximately a center part of said envelope with an inner part thereof.

13. An aircraft according to claim 10, wherein said parachute is in the shape of an umbrella, said parachute being sewn on an upper part of said envelope.

* * * * *